United States Patent
Sahouani et al.

(10) Patent No.: US 11,084,959 B2
(45) Date of Patent: Aug. 10, 2021

(54) CURABLE COMPOSITIONS INCLUDING A CHROMONIC NETWORK, ARTICLES, AND METHODS

(71) Applicant: 3M INNOVATIVE PROPERTIES COMPANY, St. Paul, MN (US)

(72) Inventors: Hassan Sahouani, Hastings, MN (US); Ying Lin, Woodbury, MN (US); Mary M. Caruso Dailey, Maplewood, MN (US); Jing Fang, Shanghai (CN); Kim M. Vogel, Lake Elmo, MN (US); Michael A. Kropp, Cottage Grove, MN (US); Matthew J. Kryger, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 337 days.

(21) Appl. No.: 16/305,907

(22) PCT Filed: Jun. 21, 2017

(86) PCT No.: PCT/US2017/038436
§ 371 (c)(1),
(2) Date: Nov. 30, 2018

(87) PCT Pub. No.: WO2017/223143
PCT Pub. Date: Dec. 28, 2017

(65) Prior Publication Data
US 2020/0347278 A1     Nov. 5, 2020

Related U.S. Application Data

(60) Provisional application No. 62/353,110, filed on Jun. 22, 2016.

(51) Int. Cl.
*C09J 163/00* (2006.01)
*B32B 7/12* (2006.01)
(Continued)

(52) U.S. Cl.
CPC ............. *C09J 163/00* (2013.01); *B32B 7/12* (2013.01); *B32B 15/092* (2013.01); *B32B 15/18* (2013.01);
(Continued)

(58) Field of Classification Search
None
See application file for complete search history.

(56) References Cited

U.S. PATENT DOCUMENTS

| | | |
|---|---|---|
| 4,472,480 A | 9/1984 | Olson |
| 4,736,048 A | 4/1988 | Brown |

(Continued)

FOREIGN PATENT DOCUMENTS

| | | |
|---|---|---|
| EP | 0554823 | 8/1993 |
| EP | 2426159 | 3/2012 |

(Continued)

OTHER PUBLICATIONS

Aran-Ais, "Developments in Microencapsulation Technology to Improve Adhesive Formulations", The Journal of Adhesion, 2012, vol. 88, pp. 391-405.

(Continued)

*Primary Examiner* — Tae H Yoon
(74) *Attorney, Agent, or Firm* — Adrian L. Pishko

(57) ABSTRACT

Curable compositions are provided including a curable system that requires a thermally generated amine to cause curing of the system, and a self-assembled particle distributed in the curable system. The curable system contains at least one reactive moiety and the self-assembled particle comprises a reactive amine ionically bound to a chromonic network. A multilayer article is also provided, including a substrate, a chromonic amine layer disposed on the substrate, and a curable layer disposed on the chromonic amine (Continued)

layer. Methods of making a cured composition and of adhering two substrates together are further provided.

9 Claims, 4 Drawing Sheets

(51) Int. Cl.
  *B32B 15/18* (2006.01)
  *B32B 15/092* (2006.01)
  *C08G 59/14* (2006.01)
  *C08K 5/3492* (2006.01)
(52) U.S. Cl.
  CPC ........ *C08G 59/1477* (2013.01); *C08K 5/3492* (2013.01); *B32B 2255/06* (2013.01); *B32B 2255/26* (2013.01)

(56) References Cited

U.S. PATENT DOCUMENTS

| | | | |
|---|---|---|---|
| 4,948,449 | A | 8/1990 | Tarbutton |
| 4,980,443 | A | 12/1990 | Kendziorski |
| 5,082,706 | A | 1/1992 | Tangney |
| 5,578,381 | A | 11/1996 | Hamada |
| 5,629,380 | A | 5/1997 | Baldwin |
| 5,948,487 | A | 9/1999 | Sahouani |
| 6,395,354 | B1 | 5/2002 | Sahouani |
| 6,699,533 | B2 * | 3/2004 | Sahouani .......... G02F 1/133711 428/1.2 |
| 7,318,991 | B2 * | 1/2008 | Ishihara ............... C07D 311/16 430/270.1 |
| 8,580,143 | B2 * | 11/2013 | Shin ........................ C09K 19/38 252/299.01 |
| 2007/0086965 | A1 * | 4/2007 | Mohanty .................. B82Y 5/00 424/63 |
| 2008/0280086 | A1 | 11/2008 | Sheridan | 
| 2011/0028603 | A1 | 2/2011 | Peretolchin |

FOREIGN PATENT DOCUMENTS

| | | | |
|---|---|---|---|
| GB | 1421149 | * | 1/1976 |
| WO | WO 02-44802 | | 6/2002 |
| WO | WO 2007-079083 | | 7/2007 |
| WO | WO 2016-105997 | | 6/2016 |

OTHER PUBLICATIONS

Attwood, "Lyotropic mesophases formation by anti-asthmatic drugs", Molec. Crystals Liq. Crystals, 1984, vol. 108, pp. 349.
Kawasaki, "Controlled Layering of Two-Dimensional J-Aggregate of Anionic Cyanine Dye on Self-Assembled Cysteamine Monolayer on Au(111)", Langmuir, 2000, vol. 16, No. 12, pp. 5409-5417.
Lydon, "Chromonic mesophases," Current Opinion in Colloid & Interface Science, 2004, vol. 8, No. 6, pp. 480-490.
Lydon, "Chromonics," Handbook of Liquid Crystals, 1998, vol. 2B, Chapter XVIII, pp. 981-1007.
Zimmermann, "Self-organized assemblies of colloidal particles obtained from an aligned chromonic liquid crystal dispersion", Soft Matter, Jan. 6, 2015, vol. 11, No. 8, pp. 1547-1553, XP055403530.
International Search report for PCT International Application No. PCT/US2017/038436 dated Sep. 13, 2017, 5 pages.

* cited by examiner

CURABLE COMPOSITIONS INCLUDING A CHROMONIC NETWORK, ARTICLES, AND METHODS

CROSS REFERENCE TO RELATED APPLICATIONS

This application is a national stage filing under 35 U.S.C. 371 of PCT/US2017/038436, filed Jun. 21, 2017, which claims the benefit of U.S. Application No. 62/353110, filed Jun. 22, 2016, the disclosures of which are incorporated by reference in their entireties herein.

TECHNICAL FIELD

The present disclosure relates to one-part thermally-activated curable compositions.

BACKGROUND

Curable compositions containing a reactive amine are often provided as a two-part formulation in which the amine is separated from the reactive moiety until immediately prior to the formation of a cured composition. Once mixed, the amine will react with the reactive moiety quickly at room or elevated temperatures. Such curable compositions tend to have good storage stability (such as one year or more) but need to be used soon after the reactive components are mixed. Further, the two parts must usually be carefully metered together for mixing so that the amounts of each part are appropriate.

Some one-part curable compositions are known, in which a latent curing agent is used. Although no mixing is required, the shelf-life of one-part systems is typically significantly reduced compared to two-part formulations. Shelf-lives of 6 months or more can be achieved through the use of latent curing agents that are thermally activated to form the cured composition. The cure temperature is often limited by the melting point of the curing agent, which typically exceeds about 170 degrees Celsius for conventional latent curing agents.

SUMMARY

Curable compositions that require a thermally generated amine to cause curing of the composition are provided, as well as multilayer articles, and methods. The curable compositions typically do not cure until a desired temperature is achieved and an amine is allowed to react and cause curing of the composition.

In a first aspect, a curable composition is provided. The curable composition comprises a curable system that requires a thermally generated amine to cause curing of the system; and a self-assembled particle distributed in the curable system. The curable system comprises at least one reactive moiety and the self-assembled particle comprises a reactive amine ionically bound to a chromonic network.

In a second aspect, a multilayer article is provided. The multilayer article comprises a substrate having a first major surface; a chromonic amine layer disposed on the first major surface of the substrate; and a curable layer disposed on the chromonic amine layer. The chromonic amine layer comprises a reactive amine ionically bound to a chromonic network. The curable layer comprises a curable system that requires a thermally generated amine to cause curing of the system, the curable system comprising a reactive moiety.

In a third aspect, a cured composition is provided. The cured composition comprises the reaction product of a curable composition. The curable composition comprises a curable system that requires a thermally generated amine to cause curing of the system; and a self-assembled particle distributed in the curable system. The curable system comprising a reactive moiety, and the self-assembled particle comprises a reactive amine ionically bound to a chromonic network.

In a fourth aspect, a method of making a cured composition is provided. The method comprises (a) obtaining a curable composition; (b) heating the curable composition to release the reactive amine from the self-assembled particle; and (c) forming a cured composition by reacting the reactive amine with the curable system. The curable composition comprises (i) a curable system that requires a thermally generated amine to cause curing of the system, the curable system comprising a reactive moiety; and (ii) a self-assembled particle distributed in the curable system, wherein the self-assembled particle comprises a reactive amine ionically bound to a chromonic network.

In a fifth aspect, a method of adhering two substrates together is provided. The method comprises (a) obtaining a multilayer article; (b) placing a second substrate adjacent to the curable layer; (c) heating the chromonic amine layer to release at least a portion of the reactive amine from being bound to the chromonic network and to react with the reactive moiety; and (d) allowing the curable layer to cure, thereby adhering the first substrate to the second substrate. The multilayer article comprises (i) a first substrate having a first major surface; (ii) a chromonic amine layer disposed on the first major surface of the substrate; and (iii) a curable layer disposed on the chromonic amine layer. The chromonic amine layer comprises a reactive amine ionically bound to a chromonic network. The curable layer comprises a curable system that requires a thermally generated amine to cause curing of the system, the curable system comprising a reactive moiety.

Figure 1:
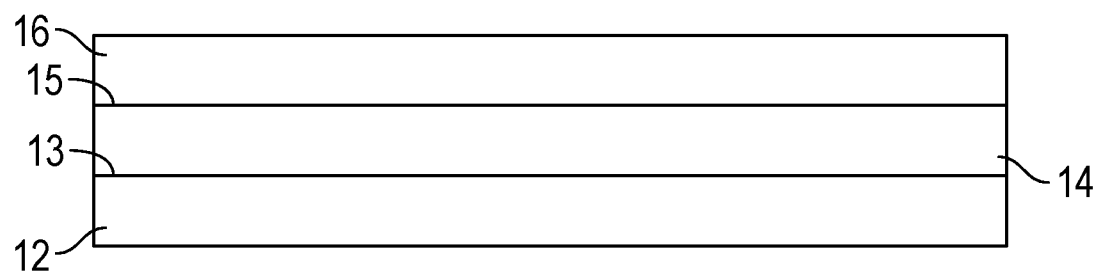
FIG. 1 is a schematic cross-sectional view of an exemplary multilayer article.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Curable compositions that require a thermally generated amine to cause curing of the composition are provided, as well as multilayer articles and methods. The curable compositions typically do not need to be stored under controlled refrigeration. Rather, at least certain exemplary curable compositions cure only after a desired temperature is achieved and an amine is allowed to react and cause curing of the composition.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example "A and/or B" means only A, only B, or both A and B.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in some embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

As used herein, "chromonic materials" (or "chromonic compounds") refers to large, multi-ring molecules typically characterized by the presence of a hydrophobic core surrounded by various hydrophilic groups (see, for example, Attwood, T. K., and Lydon, J. E., Molec. Crystals Liq. Crystals, 108, 349 (1984)). The hydrophobic core can contain aromatic and/or non-aromatic rings. When in solution, these chromonic materials tend to aggregate into a nematic ordering characterized by a long-range order. As used herein, "chromonic network" refers to chromonic materials that are aggregated into a nematic ordering.

As used herein, "dispersion" means solid chromonic nanoparticles distributed or suspended within a liquid continuous phase that does not separate over a useful time period, for example, minutes, hours, or days.

As used herein, the terms "polymer", "polymeric", and "polymeric material" are used interchangeably to refer to a homopolymer, copolymer, terpolymer, or the like.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, Si, P, and N, and both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, the terms "(meth)acrylic" and "(meth)acrylate" refer to derivatives of either methacrylic acid or acrylic acid.

In a first aspect, a curable composition is provided. The curable composition comprises a curable system that requires a thermally generated amine to cause curing of the system; and a self-assembled particle distributed in the curable system. The curable system comprises at least one reactive moiety and the self-assembled particle comprises a reactive amine ionically bound to a chromonic network. Hence, the reactive moiety is reactive with an amine. To cure the curable composition, at least a portion of the reactive amine is released from the chromonic network, contacts the reactive moiety, and initiates curing. It is thus an advantage of curable compositions according to the present disclosure to have shelf stability of at least three days at room temperature (e.g., 25° C.), preferably at least one week, or even when stored at a temperature of 40° C. for at least three days. Refrigeration of the curable compositions is typically not required to minimize curing of the curable compositions prior to their use.

Chromonic materials exist as dicarboxylic acids which, when dissolved in a basic aqueous solution (e.g., containing water and an amine), self-assemble to form a liquid crystal phase capable of intercalating other substances inside the liquid crystal network. The network is birefringent, thus it has two different refractive indices. It was surprisingly discovered that it is possible to intercalate certain basic substances themselves (e.g., amines). It is presumed that the ionic bond formed between the reactive amine and the chromonic network (e.g., the dicarboxylic acid) deactivates the amine at lower temperatures (e.g., below about 130 degrees Celsius) when present in a self-assembled particle.

Any chromonic material can be useful in the compositions and articles of the present disclosure. Compounds that form chromonic phases are known in the art, and include, for example, xanthoses (for example, azo dyes and cyanine dyes) and perylenes (see, for example, Kawasaki et al., Langmuir 16, 5409 (2000), or Lydon, J., Colloid and Interface Science, 8, 480 (2004). Representative examples of useful chromonic materials include di- and mono-palladium organyls, sulfamoyl-substituted copper phthalocyanines, and hexaaryltryphenylene.

Preferred chromonic materials include those selected from one or more of the following general formulae:

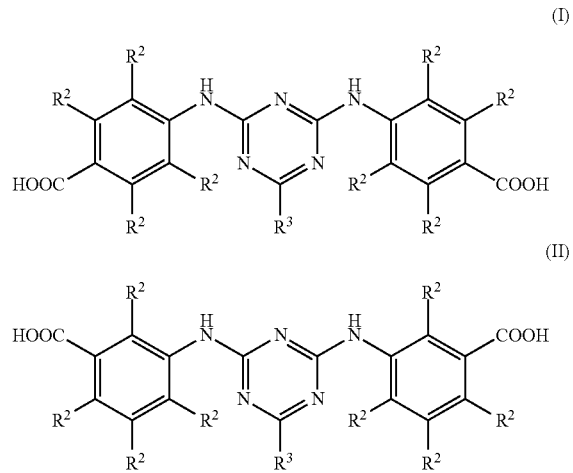

wherein
each $R^2$ is independently selected from the group consisting of electron donating groups, electron withdrawing groups, and electron neutral groups, and
$R^3$ is selected from the group consisting of a substituted and unsubstituted heteroaromatic ring, and a substituted and unsubstituted heterocyclic ring, the ring being linked to the triazine group through a nitrogen atom within the ring of $R^3$.

As depicted above, the chromonic compound is neutral, but it can exist in alternative forms such as a zwitterion or proton tautomer (for example, where a hydrogen atom is dissociated from one of the carboxyl groups and is associated with one of the nitrogen atoms in the triazine ring). The chromonic compound can also be a salt such as, for example, a carboxylate salt.

The general structures above show orientations in which the carboxyl group is para with respect to the amino linkage to the triazine backbone of the compound (Formula I) and in which the carboxyl group is meta with respect to the amino linkage to the triazine backbone (Formula II). The carboxyl group can also be a combination of para and meta orientations (not shown). Preferably, the orientation is para.

Preferably, each $R^2$ is hydrogen or a substituted or unsubstituted alkyl group. More preferably, $R^2$ is independently selected from the group consisting of hydrogen, unsubstituted alkyl groups, alkyl groups substituted with a hydroxy or halide functional group, and alkyl groups comprising an ether, ester, or sulfonyl. Most preferably, $R^2$ is hydrogen.

$R^3$ can be, but is not limited to, a heteroaromatic ring derived from pyridine, pyridazine, pyrimidine, pyrazine, imidazole, oxazole, isoxazole thiazole, oxadiazole, thiadiazole, pyrazole, triazole, triazine, quinoline, and isoquinoline. Preferably, $R^3$ comprises a heteroaromatic ring derived from pyridine or imidazole. A substituent for the heteroaromatic ring $R^3$ can be selected from, but is not limited to, the group consisting of substituted and unsubstituted alkyl, carboxy, amino, alkoxy, thio, cyano, amide, sulfonyl, hydroxy, halide, perfluoroalkyl, aryl, ether, and ester groups. Preferably, the substituent for $R^3$ is selected from the group consisting of alkyl, sulfonyl, carboxy, halide, perfluoroalkyl, aryl, ether, and alkyl substituted with hydroxy, sulfonyl, carboxy, halide, perfluoroalkyl, aryl, or ether. When $R^3$ is a substituted pyridine, the substituent is preferably located at the 4-position. When $R^3$ is a substituted imidazole, the substituent is preferably located at the 3-position.

Representative examples of $R^3$ include 4-(dimethylamino)pyridinium-1-yl, 3-methylimidazolium-1-yl, 4-(pyrrolidin-1-yl)pyridinium-1-yl, 4-isopropylpyridinium-1-yl, 4-[(2-hydroxyethyl)methylamino]pyridinium-1-yl, 4-(3-hydroxypropyl)pyridinium-1-yl, 4-methylpyridinium-1-yl, quinolinium-1-yl, 4-tert-butylpyridinium-1-yl, 2-(2-sulfoethyl)pyridinium -1-yl, [2-[hydroxyl(sulfonate)methyl]pyridinium-1-yl], pyrazinium-1-yl, (4-methylpyrimidinium-1-yl), and pyridinium-1-yl, shown below. Hence, in certain embodiments, $R^3$ is a substituted heteroaromatic ring, for instance selected from the group consisting of a monovalent group selected from substituted pyridinium, substituted imidazolium, quinolinium, and substituted pyrimidinium.

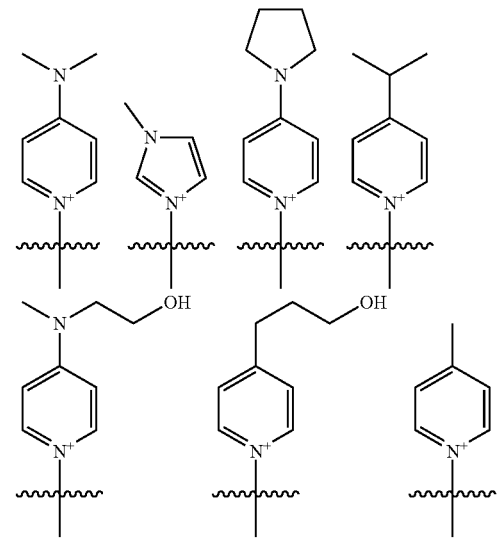

-continued

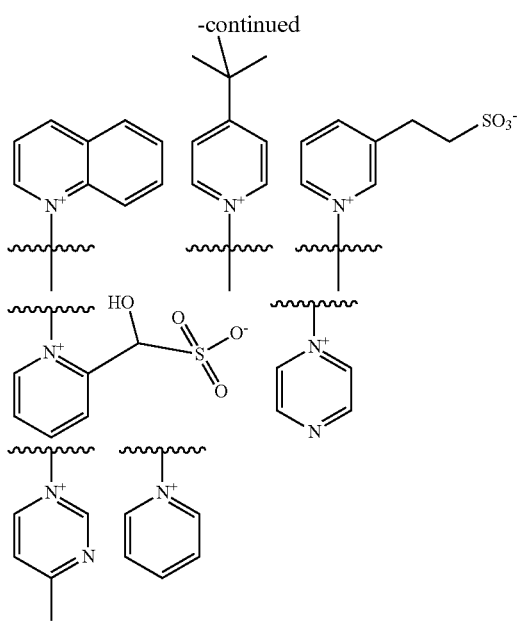

$R^3$ can also be represented by the following general structure:

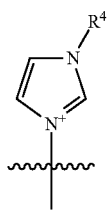

wherein $R^4$ is hydrogen or a substituted or unsubstituted alkyl group. More preferably, $R^4$ is selected from the group consisting of hydrogen, unsubstituted alkyl groups, and alkyl groups substituted with a hydroxy, ether, ester, sulfonate, or halide functional group. Most preferably $R^4$ is selected from the group consisting of propyl sulfonic acid, methyl, and oleyl.

$R^3$ can also be selected from heterocyclic rings such as, for example, morpholine, pyrrolidine, piperidine, and piperazine.

In certain embodiments, the chromonic network comprises a chromonic material of the following formula (III):

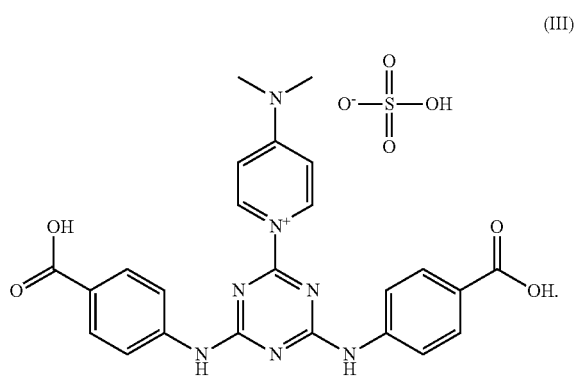 [SMILES: CN(C)c1cc[n+](-c2nc(Nc3ccc(C(=O)O)cc3)nc(Nc3ccc(C(=O)O)cc3)n2)cc1 ; O=S(=O)([O-])O]

(III)

In certain embodiments, the chromonic network comprises a chromonic material of the following formula (IV):

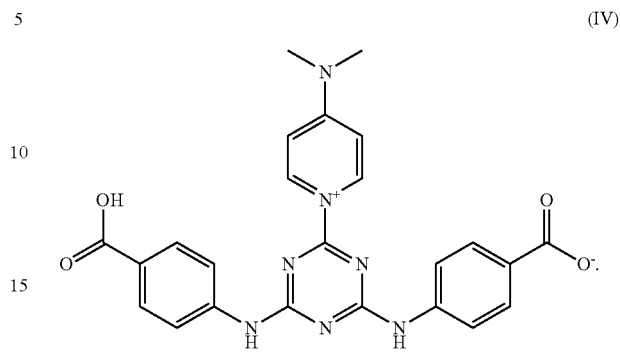

(IV)

As described in U.S. Pat. No. 5,948,487 (Sahouani et al.), triazine derivatives with Formula I can be prepared as aqueous solutions. A typical synthetic route for the triazine molecules shown in Formula I above involves a two-step process. Cyanuric chloride is treated with 4-aminobenzoic acid to give 4-{[4-(4-carboxyanilino)-6-chloro-1,3,5-triazin-2-yl]amino}benzoic acid. This intermediate is treated with a substituted or unsubstituted nitrogen-containing heterocycle. The nitrogen atom of the heterocycle displaces the chlorine atom on the triazine to form the corresponding chloride salt. The zwitterionic derivative, such as that shown in Formula III above, is prepared by dissolving the chloride salt in ammonium hydroxide and passing it down an anion exchange column to replace the chloride with hydroxide, followed by solvent removal. Alternative structures, such as that shown in Formula II above, may be obtained by using 3-aminobenzoic acid instead of 4-aminobenzoic acid.

Chromonic materials are capable of forming a chromonic phase or assembly when dissolved in an aqueous solution (preferably, an alkaline aqueous solution). Chromonic phases or assemblies are well known in the art (see, for example, Handbook of Liquid Crystals, Volume 2B, Chapter XVIII, Chromonics, John Lydon, pp. 981-1007, 1998) and consist of stacks of flat, multi-ring aromatic molecules. The molecules consist of a hydrophobic core surrounded by hydrophilic groups. The stacking can take on a number of morphologies, but is typically characterized by a tendency to form columns created by a stack of layers. Ordered stacks of molecules are formed that grow with increasing concentration.

Preferably, the chromonic material is placed in aqueous solution in the presence of one or more pH-adjusting compounds and optionally a surfactant. The addition of pH-adjusting compounds allows the chromonic material to become more soluble in aqueous solution. Suitable pH-adjusting compounds include the reactive amine.

Suitable surfactants include ionic and non-ionic surfactants (preferably, non-ionic). Optional additives such as viscosity modifiers (for example, polyethylene glycol) and/or binders (for example, low molecular weight hydrolyzed starches) can also be added.

Although large particles (for example, on the order of several millimeters in diameter) can be prepared, the mass median diameter of particles of the present disclosure is typically less than 10 microns, less than 1000 nanometers in size, less than 500 nanometers in size, and in some cases less than 100 nanometers in size.

Typically, the self-assembled particle comprises at least 1 weight percent reactive amine, at least 5 weight percent, at least 10 weight percent, at least 20 weight percent, at least 30 weight percent, or at least 40 weight percent reactive amine; and up to 80 weight percent, up to 75 weight percent, up to 70 weight percent, up to 60 weight percent, or up to 50 weight percent reactive amine. The self-assembled particle typically comprises at least 20 weight percent chromonic network, at least 25 weight percent, at least 30 weight percent, or at least 40 weight percent chromonic network; and up to 99 weight percent chromonic network, up to 95 weight percent, up to 90 weight percent, up to 80 weight percent, up to 70 weight percent, up to 60 weight percent, or up to 50 weight percent chromonic network. Stated another way, in certain embodiments the self-assembled particle may comprise 1 to 80 weight percent reactive amine and 20 to 99 weight percent chromonic network, inclusive, or 1 to 50 weight percent reactive amine and 20 to 50 weight percent chromonic network, inclusive.

In certain embodiments, the reactive amine is of the general formula (V):

wherein $R^4$ is selected from hydrogen, alkyl, aryl, or alkylaryl.

Some reactive amines are of Formula (VI) with the additional limitation that there are at least two primary amino groups, at least two secondary amino groups, or at least one primary amino group and at least one secondary amino group.

Each $R^5$ group is independently hydrogen, alkyl, aryl, or alkylaryl. Suitable alkyl groups for $R^5$ often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups for $R^5$ often have 6 to 12 carbon atoms such as a phenyl or biphenyl group. Suitable alkylaryl groups for $R^5$ can be either an alkyl substituted with an aryl or an aryl substituted with an alkyl. The same aryl and alkyl groups discussed above can be used in the alkylaryl groups. Each $R^6$ is independently an alkylene, heteroalkylene, or combination thereof. Suitable alkylene groups often have 1 to 18 carbon atoms, 1 to 12 carbon atoms, 1 to 8 carbon atoms, 1 to 6 carbon atoms, or 1 to 4 carbon atoms. Suitable heteroalkylene groups have at least one oxy, thio, or —NH— group positioned between two alkylene groups. Suitable heteroalkylene groups often have 2 to 50 carbon atoms, 2 to 40 carbon atoms, 2 to 30 carbon atoms, 2 to 20 carbon atoms, or 2 to 10 carbon atoms and up to 20 heteroatoms, up to 16 heteroatoms, up to 12 heteroatoms, or up to 10 heteroatoms. The heteroatoms are often oxy groups. The variable q is an integer equal to at least one and can be up to 10 or higher, up to 5, up to 4, or up to 3.

Some reactive amines can have an $R^6$ group selected from an alkylene group. Examples include, but are not limited to, ethylene diamine, diethylene diamine, diethylene triamine, triethylene tetramine, propylene diamine, tetraethylene pentamine, hexaethylene heptamine, hexamethylene diamine, 2-methyl-1,5-pentamethylene diamine, 1-amino-3-aminomethyl-3,3,5-trimethylcyclohexane (also called isophorene diamine), 1,3 bis-aminomethyl cyclohexane, 1,10-dimainodecane, 1,12-diaminododecene, and the like.

Other reactive amines can have an $R^3$ group selected from a heteroalkylene group such as a heteroalkylene having oxygen heteroatoms. For example, the reactive amine can be a compound such as aminoethylpiperazine, 4,7,10-trioxatridecane-1,13-diamine (TTD) available from TCI America in Portland, Oreg., or a poly(alkylene oxide) diamine (also called polyether diamines) such as a poly(ethylene oxide) diamine, poly(propylene oxide) diamine, or a copolymer thereof. Commercially available polyether diamines are commercially available under the trade designation JEFFAMINE from Huntsman Corporation in The Woodlands, Tex.

Still other reactive amines can be formed by reacting a polyamine (i.e., a polyamine refers to an amine with at least two amino groups selected from primary amino groups and secondary amino groups) with another reactant to form an amine-containing adduct having at least two amino groups. For example, a polyamine can be reacted with an epoxy resin to form an adduct having at least two amino groups. If a polymeric diamine is reacted with a dicarboxylic acid in a molar ratio of diamine to dicarboxylic acid that is greater than or equal to 2:1, a polyamidoamine having two amino groups can be formed. In another example, if a polymeric diamine is reacted with an epoxy resin having two glycidyl groups in a molar ratio of diamine to epoxy resin greater than or equal to 2:1, an amine-containing adduct having two amino groups can be formed. Such a polyamidoamine can be prepared as described, for example, in U.S. Pat. No. 5,629,380 (Baldwin et al.). A molar excess of the polymeric diamine is often used so that the reactive amine includes both the amine-containing adduct plus free (non-reacted) polymeric diamine. For example, the molar ratio of diamine to epoxy resin with two glycidyl groups can be greater than 2.5:1, greater than 3:1, greater than 3.5:1, or greater than 4:1. Even when epoxy resin is used to form the amine-containing adduct in the second part of the curable coating composition, additional epoxy resin is present in the first part of the curable coating composition.

The reactive amine can also be one or more aromatic rings substituted with multiple amino groups or with amino-containing groups. Such reactive amines include, but are not limited to, xylene diamines (e.g., meta-xylene diamine) or similar compounds. For example, one such reactive amine is commercially available under the trade designation ANCAMINE (e.g., ANCAMINE 2609) from Air Products and Chemicals, Inc. in Allentown, Pa., USA and under the trade designation ARADUR 2965 from Huntsman Corporation (The Woodlands, Tex., USA). This particular reactive amine is based on meta-xylene diamine. Another example reactive amine is 4,4'-diaminodiphenyl sulfone (DDS), which is commercially available as ARADUR 9964-1 from Huntsman Corporation.

Still other reactive amines are typically considered to be secondary curatives or latent curatives because, compared to reactive amines having at least two groups of formula —$NHR^7$, they are not as reactive with the oxarine rings of the epoxy resins at room temperature. Often, these amines are reactive above their melting temperature (e.g., above 150° C., above 170° C., or above 200° C.). Secondary curatives are often imidazoles or salts thereof or imidazolines or salts thereof, substituted ureas (e.g., bis-substituted ureas such as 4,4'-methylene bis(phenyl dimethyl) urea and toluene diisocyanate urea), dicyanamide or derivatives thereof, hydrozides such as aminodihydrazide, adipic dihydrazide, isophthalyl dihydrazide, guanidines such as tetramethyl guanidine, or phenols substituted with tertiary amino groups.

Suitable imidazole compounds include 1-N substituted imidazole, 2-C substituted imidazoles, and metal imidazole salts as described in U.S. Pat. No. 4,948,449 (Tarbutton et al.). Example imidazole compounds are commercially available from Air Products and Chemicals under the trade designation CUREZOL (e.g., CUREZOL 2PZ-S, 2MA-AZINE, and 2MA-OK), under the trade designation ARADUR (ARADUR 3123) from Huntsman Corporation, and from CVC Thermoset Specialties under the trade designation OMICURE (e.g., OMICURE U-35, U-52, and U-52M).

Suitable phenols substituted with tertiary amino groups can be of Formula (VII).

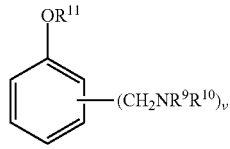

(VII)

In Formula (VII), each group $R^9$ and $R^{10}$ is independently an alkyl. The variable v is an integer equal to 2 or 3. Group $R^{11}$ is hydrogen or alkyl. Suitable alkyl groups for $R^9$, $R^{10}$, and $R^{11}$ often have 1 to 12 carbon atoms, 1 to 8 carbon atoms, 1 to 6 carbon atoms, or 1 to 4 carbon atoms. One exemplary tertiary amine of Formula (VII) is 2,4,6-Tri (dimethylaminomethyl) phenol that is commercially available under the trade designation ANCAMINE K54 from Air Products and Chemicals, Inc. of Allentown, Pa., USA.

In some embodiments, the self-assembled particle further comprises a coating layer disposed on at least a portion of an outer surface of the self-assembled particle. In such embodiments the self-assembled particle often comprises 1 to 79 weight percent coating layer, or 1 to 50 weight percent coating layer. The coating layer contains a thermoplastic, wax, a fluoropolymer, a plurality of silica particles, or mixture thereof.

Both thermoplastic polymers and waxes soften when exposed to heat and return to their original forms when cooled to room temperature. The term "thermoplastic" is usually applied to synthetic polymeric materials but can also include naturally occurring polymeric materials having a molecular weight that is greater than most naturally occurring waxes. As used herein, the term "wax" refers to materials that have a lower molecular weight than the polymeric materials that are typically classified as thermoplastics. Waxes usually have at least one long alkyl chain (e.g., 4 to 24 carbon atoms) and are often classified as lipids. Some waxes are hydrocarbons (e.g., paraffin and polyethylene) while many natural waxes are esters of fatty acids and long chain alcohols (e.g., 4 to 24 carbon atoms). Because of the difference in molecular weight, waxes typically have a distinct melting point while thermoplastics have a glass transition temperature.

The thermoplastic polymeric material, wax, and/or fluoropolymer, are typically selected to be soluble or dispersible in water, an organic solvent, or a mixture thereof. None of these materials are tacky (i.e., the glass transition temperature is typically at least 20° C.). The thermoplastic polymer is typically selected to be rubbery and not brittle. The thermoplastic polymer is typically a linear polymer and is crosslinked or not crosslinked to such a low amount that it can still be dissolved or dispersed in water, an organic solvent, or a mixture thereof.

Suitable thermoplastic polymers for use in the coating solution when the reactive amine is a polar compound include, but are not limited to, silicone-based thermoplastic polymers, (meth)acrylate-based thermoplastic polymers, olefin-based thermoplastic polymers, and styrene-based thermoplastic polymers.

Suitable thermoplastic polymers include, but are not limited to, poly(vinylpyrrolidone) (PVP), copolymers of vinylpyrrolidone and vinyl acetate, (meth)acrylate-based polymers with acidic groups (such as copolymers of an alkyl (meth)acrylate as described above and (meth)acrylic acid), polyesters, polyamides, and polyvinyl alcohols. The weight average molecular weight is often at least 1,000 Daltons, at least 2,000 Daltons, at least 5,000 Daltons, or at least 10,000 Daltons. The weight average molecular weight can be up to 500,000 Daltons or higher. For example, the weight average molecular weight can be up to 300,000 Daltons, up to 200,000 Daltons, up to 100,000 Daltons, up to 50,000 Daltons, or up to 20,000 Daltons. Some such thermoplastic polymers can be obtained, for example, from Polysciences, Inc. (Warrington, Pa., USA).

Wax dispersions typically contain a wax having a hydrophilic group that allows dispersion in water or are stabilized by a surfactant. Examples include dispersions of polyethylene, paraffin waxes, Carnauba wax, and the like. Such materials are commercially available under the trade designation SYNCERA from Paramelt (Muskegon, Mich., USA), under the trade designation LIQUITRON from Lubrizol Advanced Materials, Inc. (McCook, Ill., USA), and under the trade designation CARNAUBA MILK from Koster Keunen (Watertown, Conn., USA).

Suitable fluoropolymers include the polymerized product of a monomer composition (second monomer composition) containing one or more fluorinated monomers. The fluorinated monomers often have a (meth)acryloyl group. In many embodiments, the fluorinated monomer is of Formula (X)

$$Rf-Q-O-(CO)-CR^1=CH_2 \qquad (X)$$

where $R^1$ is hydrogen or methyl, Rf is an fluorinated alkyl and Q is a divalent linking group. Group Q is not fluorinated. Group Rf can be partially fluorinated or fully fluorinated (i.e., the fluorinated alky is a perfluoroalkyl).

In some embodiments, the fluorinated alkyl has zero or one hydrogen atom. That is, the fluorinated alkyl is a perfluoroalkyl (i.e., the fluorinated alkyl has no hydrogen atoms) or the fluorinated alkyl has a single hydrogen atom at the end of the Rf group furthest from group Q (i.e., the hydrogen atom is attached to the carbon atom furthest away from group Q). Suitable Rf fluorinated alkyl groups often have at least 1 carbon atom, at least 2 carbon atoms, or at least 3 carbon atoms and can have up to 12 carbon atoms, up to 10 carbon atoms, up to 8 carbon atoms, or up to 6 carbon atoms. In many embodiments, the Rf group has 3 to 5 carbon atoms.

Any suitable divalent Q linking group can be used. Example Q groups include, but are not limited to, $-SO_2-NR^{11}-(CH_2)_k-$, $-(CH_2)_k-$, $-(CH_2)_k-O-(CH_2)_k-$, $-(CH_2)_k-SO_2-(CH_2)_k-$, $-(CH_2)_k-SO_2-NR^{11}-(CH_2)_k-$, $-(CH_2)_k-S-(CH_2)_k-$, $-(CO)-NR^{11}-(CH_2)_k-$, $-CH_2CH(OR^{12})-CH_2-$, $-(CH_2)_k-SO_2-$, and $-O-(CO)-NR^{11}-(CH_2)_k-$. In these Q groups, $R^{11}$ is hydrogen, alkyl, or aryl. The group $R^{12}$ is hydrogen or alkyl. Suitable alkyl groups for $R^{11}$ and $R^{12}$ have 1 to 10 carbon atoms, 1 to 6 carbon atoms, or 1 to 4 carbon atoms.

$R^{11}$ aryl groups can have 6 to 10 carbon atoms but is often phenyl. The variable k is an integer in a range of 1 to 20, 1 to 10, 1 to 6, 1 to 4, or 1 to 3.

In some embodiments, the fluorinated monomers of Formula (X) are of Formula (X-1) where the linking group Q is Formula (X) is —$(CH_2)_k$—.

$$Rf-(CH_2)_k-O-(CO)-CR^1=CH_2 \quad (X-1)$$

In Formula (X-1), the groups $R^1$ and Rf and the variable k are the same as defined above for Formula (X). In some particular embodiments, the Rf has 3 or 5 carbon atoms and the variable k is either 1 or 2. Specific examples of fluorinated monomers of Formula (X) include, but are not limited to, $C_3F_7CH_2O(CO)C(CH_3)=CH_2$, $C_3F_7CH_2CH_2O(CO)C(CH_3)=CH_2$, $C_5F_{11}CH_2O(CO)C(CH_3)=CH_2$, and $C_5F_{11}CH_2CH_2O(CO)C(CH_3)=CH_2$.

In other embodiments, the fluorinated monomers of Formula (X) are of Formula (X-2) where the linking group Q in Formula (X) is —$SO_2$—$NR^{11}$—$(CH_2)_k$—.

$$Rf\text{-}SO_2-NR^{11}-(CH_2)_k-O-(CO)-CR^1=CH_2 \quad (X-2)$$

In Formula (X-2), the groups Rf, $R^{11}$, $R^1$, and the variable k are the same as defined for Formula (X) or group Q in Formula (X). In some embodiments, Rf has 1 to 6 carbon atoms or 3 to 6 carbon atoms and k is equal to 2. Specific examples of fluorinated monomers of Formula (XI) include, but are not limited to, $C_4F_9SO_2N(CH_3)CH_2CH_2O(CO)C(CH_3)=CH_2$, $C_4F_9SO_2N(CH_3)CH_2CH_2O(CO)CH=CH_2$, $C_4F_9SO_2N(C_4H_9)CH_2CH_2O(CO)C(CH_3)=CH_2$, $C_4F_9SO_2N(C_8H_{17})CH_2CH_2O(CO)C(CH_3)=CH_2$, $C_4F_9SO_2NHCH_2CH_2O(CO)C(CH_3)=CH_2$, $C_6F_{13}SO_2N(CH_3)CH_2CH_2O(CO)C(CH_3)=CH_2$, and $CF_3SO_2N(CH_3)CH_2CH_2O(CO)C(CH_3)=CH_2$.

The fluorinated monomers of Formula (X) (such as those of Formula (X-1) or (X-2)) can be polymerized to form a homopolymer or can be copolymerized with various non-fluorinated monomers such as, for example, an alkyl (meth)acrylate of Formula (XI).

$$R^{13}-O-(CO)-CR^1=CH_2 \quad (XI)$$

In Formula (XI), group $R^1$ is hydrogen or methyl and group $R^{13}$ is an alkyl having at least 1 carbon atom, at least 2 carbon atoms, at least 4 carbon atoms, at least 6 carbon atoms, or at least 10 carbon atoms and having up to 20 carbon atoms, up to 16 carbon atoms, or up to 12 carbon atoms. In some embodiments, $R^{14}$ has 1 to 20 carbon atoms such as 4 to 20 carbon atoms, 4 to 12 carbon atoms, 10 to 20 carbon atoms, or 16 to 20 carbon atoms. The alkyl groups can be linear, branched, cyclic, or a combination thereof (e.g., it can have a linear or branched group as well as a cyclic group) depending on the number of carbon atoms.

Copolymers formed from a second monomer composition that includes both a fluorinated monomer of Formula (X) and an alkyl (meth)acrylate monomer of Formula (XI) often contain at least 30 weight percent of the monomer of Formula (X). For example, the second monomer composition contains at least 35 weight percent, at least 40 weight percent, or at least 50 weight percent and up to 99 weight percent, up to 95 weight percent, up to 90 weight percent, up to 80 weight percent, up to 70 weight percent, or up to 60 weight percent of the fluorinated monomer of Formula (X). In some of these examples, the only other monomers in the second monomer composition are alkyl (meth)acrylates of Formula (XI). That is, the second monomer composition includes, for example, 30 to 99 weight percent fluorinated monomer of Formula (X) and 1 to 70 weight percent monomer of Formula (XI), 30 to 90 weight percent fluorinated monomer of Formula (X) and 10 to 70 weight percent alkyl (meth)acrylate of Formula (XI), 30 to 80 weight percent fluorinated monomer of Formula (X) and 20 to 70 weight percent alkyl (meth)acrylate of Formula (XI), 50 to 99 weight percent fluorinated monomer of Formula (X) and 1 to 50 weight percent alkyl (meth)acrylate of Formula (XI). The weight percent amounts are based on the total weight of monomers in the second monomer composition.

The second monomer compositions containing the fluorinated monomer of Formula (X) (such as those of Formula (X-1) or (X-2)) can optionally include a polar monomer such as (meth)acrylic acid. The polar monomer may facilitate adhesion of the fluorinated coating layer to the porous polymeric core particle. If (meth)acrylic acid is included in the second monomer composition, its concentration is typically no greater than 5 weight percent based on a total weight of the monomers in the second monomer composition. For example, the amount can be at least 0.5 weight percent, at least 1 weight percent, at least 1.5 weight percent, or at least 2 weight percent and can be up to 5 weight percent, up to 4 weight percent, or up to 3 weight percent. If used in higher amounts, the resulting fluorinated copolymer may not be sufficiently hydrophobic. That is, the second monomer composition contains 0.5 to 5 weight percent polar monomer such as (meth)acrylic acid and 95 to 99.5 weight percent fluorinated monomer of Formula (X).

In some embodiments, the second monomer composition can include 30 to 100 weight percent fluorinated monomer of Formula (X), 0 to 70 weight percent alkyl (meth)acrylate of Formula (XI), and 0 to 5 weight percent (meth)acrylic acid. Such monomer compositions often contain 30 to 99 weight percent fluorinated monomer of Formula (X), 1 to 70 weight percent alkyl (meth)acrylate of Formula (XI) and 0.5 to 5 weight percent (meth)acrylic acid. For example, the second monomer composition can include 30 to 70 weight percent fluorinated monomer of Formula (X), 30 to 70 weight percent alkyl (meth)acrylate of Formula (XI), and 0.5 to 5 weight percent (meth)acrylic acid or 50 to 95 weight percent fluorinated monomer of Formula (X), 1 to 50 weight percent alkyl (meth)acrylate of Formula (XI), and 0.5 to 5 weight percent (meth)acrylic acid.

Suitable silica particles include for instance and without limitation, dispersions of submicron size silica nanoparticles in an aqueous, organic solvent or in a water/organic solvent mixture. Generally, the silica nanoparticles have an average primary particle diameter of up to 1000 nanometers. The average particle size may be determined using transmission electron microscopy.

Inorganic silica sols in aqueous media are well known in the art and available commercially. Silica sols in water or water-alcohol solutions are available, for example, under the trade designations "LUDOX" from E.I. duPont de Nemours and Co., Inc., Wilmington, Del.; "NYACOL" from Nyacol Co., Ashland, Mass.; and "NALCO" from Ondea Nalco Chemical Co., Oak Brook, Ill. One useful silica sol is NALCO 2326 available as a silica sol with mean particle size of 5 nanometers, pH 10.5, and solid content 15% by weight. Other commercially available silica nanoparticles include "NALCO 1115" and "NALCO 1130," commercially available from NALCO Chemical Co., "REMASOL SP30," commercially available from Remet Corp., Utica, N.Y., and "LUDOX SM," commercially available from E.I. Du Pont de Nemours Co., Inc.

Any suitable method can be used to deposit a coating layer on at least a portion of the surface of a self-assembled particle. The coating solution or coating dispersion is often mixed with the self-assembled particles, and after sufficient mixing, the solvent is removed to provide a coating layer. The coating solution or coating dispersion often contains at least 5 weight percent, at least 10 weight percent, at least 15 weight percent, or at least 20 weight percent solids. The weight percent solids corresponds to the weight percent thermoplastic polymer and/or wax in the coating solution or coating dispersion. The weight percent solids can be up to 70 weight percent or even higher, up to 60 weight percent, up to 50 weight percent, up to 40 weight percent, or up to 30 weight percent. For example, the weight percent solids can be in a range of 10 to 70 weight percent, 20 to 60 weight percent, 20 to 50 weight percent, inclusive, or 20 to 40 weight percent, inclusive.

Spray drying (spray coating and drying) or similar processes such as fluidized bed coating and drying that can result in the formation of a coating layer with relatively uniform thickness around the self-assembled particles can often be used. With spray drying, the self-assembled particles are mixed with the coating solution or coating dispersion to form a slurry. This slurry is then pumped to a drying chamber that contains an atomizer (to form droplets) and a drying gas. Some common types of atomization include rotary wheel (centrifugal) atomization, single-fluid/pressure nozzle (hydraulic) atomization, two-fluid nozzle (pneumatic) atomization, and ultrasonic atomization. The product, which is the self-assembled particles having a coating layer, can be collected by various means such as by gravity or by using a cyclone, filter and bag, electrostatic separation, or the like.

The coating layer can have any desired thickness. In some embodiments, the thickness is at least 0.1 micrometers, at least 0.2 micrometers, at least 0.5 micrometers, at least 0.75 micrometers, or at least 1.0 micrometers. The thickness can be up to 5 micrometers, up to 4 micrometers, up to 3 micrometers, or up to 2 micrometers.

The curable composition typically includes at least 5 weight percent self-assembled particles, at least 10 weight percent, at least 15 weight percent, at least 20 weight percent, or at least 25 weight percent self-assembled particles; and up to 45 weight percent self-assembled particles, up to 40 weight percent, up to 35 weight percent, or up to 30 weight percent self-assembled particles. The curable composition typically includes at least 55 weight percent curable system, at least 60 weight percent, at least 65 weight percent, or at least 70 weight percent; and up to 95 weight percent curable system, up to 90 weight percent, up to 80 weight percent, or up to 75 weight percent curable system. Stated a different way, the curable composition may comprise 5 to 45 weight percent self-assembled particles and 55 to 95 weight percent curable system. If lower levels of curable system are used, the cured composition may not contain enough polymeric material (e.g., epoxy resin) to provide the desired characteristics (e.g., adhesion).

When the at least one reactive moiety comprises an epoxy resin, the epoxy resin contains at least one epoxy functional group (i.e., oxirane group) per molecule. As used herein, the term oxirane group refers to the following divalent group.

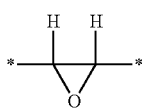

The asterisks denote a site of attachment of the oxirane group to another group. If the oxirane group is at the terminal position of the epoxy resin, the oxirane group is typically bonded to a hydrogen atom.

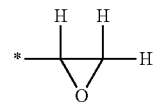

This terminal oxirane group is often part of a glycidyl group.

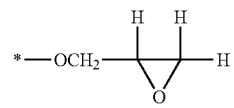

The epoxy resin has at least one oxirane group per molecule and often has at least two oxirane groups per molecule. For example, the epoxy resin can have 1 to 10, 2 to 10, 1 to 6, 2 to 6, 1 to 4, or 2 to 4 oxirane groups per molecule. The oxirane groups are usually part of a glycidyl group. Preferably, the epoxy resin comprises an epoxide equivalent number of 2.0 or greater. As used herein, "epoxide equivalent number" refers to the average number of epoxide groups per molecule. Certain molecules may contain more than 2 epoxide groups and certain other molecules may contain fewer (or no) epoxide groups, but the average number of epoxide groups per molecule in the resin will be at least 2.0.

Epoxy resins can be a single material or a mixture of materials selected to provide the desired viscosity characteristics before curing and to provide the desired mechanical properties after curing. If the epoxy resin is a mixture of materials, at least one of the epoxy resins in the mixture is usually selected to have at least two oxirane groups per molecule. For example, a first epoxy resin in the mixture can have two to four or more oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups.

That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular weight is usually at least 100 grams/mole, at least 150 grams/mole, at least 175 grams/mole, at least 200 grams/mole, at least 250 grams/mole, or at least 300 grams/mole. The weight average molecular weight can be up to 50,000 grams/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 grams/mole, in the range of 100 to 1,000 grams/mole, or in the range of 200 to 1,000 grams/mole.

Suitable epoxy resins are typically a liquid at room temperature (e.g., about 20° C. to about 25° C. or about 20° C. to about 30° C.). However, epoxy resins that can be dissolved in a suitable organic solvent also can be used. In certain embodiments, the epoxy resin is a glycidyl ether. Exemplary glycidyl ethers can be of Formula (VIII).

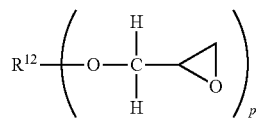

(VIII)

In Formula (VIII), group $R^{12}$ is a p-valent group that is aromatic, aliphatic, or a combination thereof. Group $R^{12}$ can be linear, branched, cyclic, or a combination thereof. Group $R^{12}$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 1, p is often an integer in the range of 2 to 10, in the range of 2 to 6, or in the range of 2 to 4.

In some exemplary epoxy resins of Formula (VIII), the variable p is equal to 2 (i.e., the epoxy resin is a diglycidyl ether) and $R^{12}$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or combination thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms with 1 to 10 heteroatoms, 1 to 6 heteroatoms, or 1 to 4 heteroatoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene or biphenylene. Group $R^{12}$ can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (VIII) are diglycidyl ethers where $R^{12}$ includes (a) an arylene group or (b) an arylene group in combination with an alkylene, heteroalkylene, or both. Group $R^2$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (VIII) are derived from bisphenol A (i.e., bisphenol A is 4,4'-dihydroxydiphenylmethane). Examples include, but are not limited to, those available under the trade designation EPON (e.g., EPON 828, EPON 872, EPON 1001, EPON 1004, EPON 2004, EPON 1510, and EPON 1310) from Momentive Specialty Chemicals, Inc. in Columbus, Ohio, USA, those available under the trade designation DER (e.g., DER 331, DER 332, DER 336, and DER 439) from Dow Chemical Co. in Midland, Mich., USA and those available under the trade designation EPICLON (e.g., EPICLON 850) from Dainippon Ink and Chemicals, Inc. in Chiba, Japan. Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Dow Chemical Co., those available under the trade designation EPICLON (e.g., EPICLON 830) from Dainippon Ink and Chemicals, Inc. in Parsippany, N.J., USA, and those available under the trade designation ARALDITE (e.g., ARALDITE GY 281) from Huntsman Corporation in The Woodlands, Tex., USA.

Other epoxy resins of Formula (VIII) are diglycidyl ethers of a poly(alkylene oxide) diol. These epoxy resins also can be referred to as diglycidyl ethers of a poly(alkylene glycol) diol. The variable p is equal to 2 and $R^{12}$ is a heteroalkylene having oxygen heteroatoms. The poly(alkylene glycol) portion can be a copolymer or homopolymer and often include alkylene units having 1 to 4 carbon atoms. Examples include, but are not limited to, diglycidyl ethers of poly(ethylene oxide) diol, diglycidyl ethers of poly(propylene oxide) diol, and diglycidyl ethers of poly(tetramethylene oxide) diol. Epoxy resins of this type are commercially available from Polysciences, Inc. in Warrington, Pa., USA such as those derived from a poly(ethylene oxide) diol or from a poly(propylene oxide) diol having a weight average molecular weight of about 400 grams/mole, about 600 grams/mole, or about 1000 grams/mole.

Still other epoxy resins of Formula (VIII) are diglycidyl ethers of an alkane diol ($R^{12}$ is an alkylene and the variable p is equal to 2). Examples include a diglycidyl ether of 1,4-dimethanol cyclohexyl, diglycidyl ether of 1,4-butanediol, and a diglycidyl ether of the cycloaliphatic diol formed from a hydrogenated bisphenol A such as those commercially available under the trade designation EPONEX (e.g., EPONEX 1510) from Hexion Specialty Chemicals, Inc. (Columbus, Ohio) and under the trade designation EPALLOY (e.g., EPALLLOY 5001) from CVC Thermoset Specialties (Moorestown, N.J.).

For some applications, suitable epoxy resins include novolac epoxy resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. The resulting novolac epoxy resins typically have more than two oxirane groups and can be used to produce cured compositions with a high crosslinking density. The use of novolac epoxy resins can be particularly desirable in applications where corrosion resistance, water resistance, chemical resistance, or a combination thereof is desired. One such novolac epoxy resin is poly[(phenyl glycidyl ether)-co-formaldehyde]. Other suitable novolac resins are commercially available under the trade designation ARALDITE (e.g., ARALDITE GY289, ARALDITE EPN 1183, ARALDITE EP 1179, ARALDITE EPN 1139, and ARALDITE EPN 1138) from Huntsman Corporation in The Woodlands, Tex., USA under the trade designation EPALLOY (e.g., EPALLOY 8230) from CVC Thermoset Specialties in Moorestown, N.J., USA and under the trade designation DEN (e.g., DEN 424 and DEN 431) from Dow Chemical in Midland, Mich., USA.

Yet other epoxy resins include silicone resins with at least two glycidyl groups and flame retardant epoxy resins with at least two glycidyl groups (e.g., a brominated bisphenol-type epoxy resin having at least two glycidyl groups such as that commercially available from Dow Chemical Co. in Midland, Mich., USA under the trade designation DER 580).

The epoxy resin is often a mixture of materials. For example, the epoxy resins can be selected to be a mixture that provides the desired viscosity or flow characteristics prior to curing. The mixture can include at least one first epoxy resin that is referred to as a reactive diluent that has a lower viscosity and at least one second epoxy resin that has a higher viscosity. The reactive diluent tends to lower the viscosity of the epoxy resin composition and often has either a branched backbone that is saturated or a cyclic backbone that is saturated or unsaturated. Examples include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER (e.g., HELOXY MODIFIER 107) from Hexion Specialty Chemicals in Columbus, Ohio, USA and under the trade designation EPODIL (e.g., EPODIL 757) from Air Products and Chemicals, Inc. in Allentown, Pa., USA. Other reactive diluents have only one functional group (i.e., oxirane group) such as various monoglycidyl ethers. Some example monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some monoglycidyl ethers that are commercially available include those under the trade designation EPODIL from Air Products and Chemicals, Inc. in Allentown, Pa., USA such as EPODIL 746 (2-ethylhexyl glycidyl ether), EPODIL 747 (aliphatic glycidyl ether), and EPODIL 748 (aliphatic glycidyl ether).

Still other epoxy resins are designed to reduce amine blushing. These epoxy resins are usually added into curable compositions at relatively low levels. Such an epoxy resin is commercially available under the trade designation DW 1765 from Huntsman Corporation, The Woodlands, Tex., USA. This material has a paste-like consistency but is based on a liquid epoxy resin.

In some embodiments, the curable system includes at least one (meth)acrylate resin (e.g., poly(meth)acrylate) having epoxy functionality, for instance ethyl (meth)acrylate, ethyl (meth)acrylate, n-propyl (meth)acrylate, isopropyl (meth)acrylate, n-butyl (meth)acrylate, isobutyl (meth) acrylate, etc., comprising a plurality of three-membered or four-membered epoxy alkyl (propylene oxide or butylene oxide) units. In certain embodiments, the epoxy functionalized (meth)acrylate comprises the above-mentioned (meth) acrylates substituted by propylene oxide. The epoxy functionalized (meth)acrylate optionally comprises glycidyl (meth)acrylate, 4-hydroxybutyl acrylate glycidyl ether (4HBAGE), 3,4-epoxycyclohexyl methacrylate, 3,4-epoxycyclohexylmethyl methacrylate, or a combination thereof.

The curable composition optionally may also contain one or more conventional additives such as fillers (e.g., aluminum powder, carbon black, glass bubbles, talc, clay, calcium carbonate, barium sulfate, titanium dioxide, silica such as fused silica, silicates, glass beads, and mica), fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the trade designation EXPANCEL by Expancel Inc. (Duluth, Ga., USA). Particulate fillers can be in the form of flakes, rods, spheres, and the like. Additives are typically added in amounts to produce the desired effect in the resulting cured composition.

In a second aspect, a multilayer article is provided. The multilayer article comprises a substrate having a first major surface; a chromonic amine layer disposed on the first major surface of the substrate; and a curable layer disposed on the chromonic amine layer. Referring to FIG. 1, the multilayer article 10 comprises a substrate 12 having a first major surface 13; a chromonic amine layer 14 disposed on the first major surface of the substrate 13; and a curable layer 16 disposed on the chromonic amine layer 14 (e.g., on a first major surface of the chromonic amine layer 15). The chromonic amine layer comprises a reactive amine ionically bound to a chromonic network. The curable layer comprises a curable system that requires a thermally generated amine to cause curing of the system, and the curable system comprises a reactive moiety. The reactive amine, chromonic material, and reactive moiety can each be selected as described in detail with respect to the first aspect above. Moreover, additional components present in the curable layer can include the further optional components described with respect to the first aspect (i.e., curable composition) above.

In certain embodiments, the chromonic amine layer has a dry thickness of at least 0.1 micrometers, at least 0.25 micrometers, at least 0.5 micrometers, at least 0.75 micrometers, at least 1 micrometer, or at least 3 micrometers; and up to 10 micrometers, up to 8 micrometers, up to 6 micrometers, or up to 5 micrometers. Stated another way, in some embodiments the chromic layer may have a dry thickness of from 0.1 micrometers to 10 micrometers, inclusive. Too thin of a chromonic amine layer may not provide sufficient reactive amine to the curable layer, while too thick of a chromonic amine layer may be detrimental to the surface properties of the curable layer (e.g., decrease the ability of the curable layer to adhere to a substrate adjacent to the chromonic amine layer).

The thickness of the curable layer is not particularly limited. In certain embodiments, the curable layer has a dry thickness of at least 1 micrometer, at least 5 micrometers, at least 10 micrometers, at least 20 micrometers, at least 30 micrometers, or at least 40 micrometers; and up to 100 micrometers, up to 90 micrometers, up to 80 micrometers, up to 70 micrometers, up to 60 micrometers, or up to 50 micrometers. Stated another way, in some embodiments the chromic layer may have a dry thickness of from 1 micrometer to 100 micrometers, inclusive. Depending on the application, a curable layer that is too thin may not have sufficient structural integrity following curing, while too thick of a curable layer may be difficult to cure sufficiently homogeneously or may provide more curable system than is needed for the application.

Substrates can be selected from various materials depending on the application. Materials useful for substrates include, but are not limited to, metals, ceramics, glasses, composite materials, polymeric materials, and the like. Metals useful as substrates include, but are not limited to, aluminum and steel, such as high strength steel, stainless steel, galvanized steel, cold-rolled steel, and surface-treated metals. Surface treatments include, but are not limited to, paints, oil draw lubricants or stamping lubricants, electrocoats, powder coats, primers, chemical and physical surface treatments, and the like. Composites useful as substrates in the present disclosure include, but are not limited, to glass reinforced composites and carbon reinforced composites. Polymeric materials useful as substrates in the present disclosure include, but are not limited to nylon, polycarbonate, polyester, (meth)acrylate polymers and copolymers, acrylonitrile-butadiene-styrene copolymers, and the like.

In some embodiments, the multilayer article further includes a liner disposed on the curable layer (e.g., a release liner). Any suitable liner can be used, such as paper (e.g., Kraft paper) or polymeric films. In many applications, polymeric films are preferred. Polymeric films used as liners can be formed, for example, from polyester such as polyethylene terephthalate or polyolefins such as polyethylene, polypropylene, or combinations thereof. The surface of a release liner can be optionally treated with a release agent such as a silicone, a fluorochemical such as a fluorosilicone, or other low surface energy materials such as a polyolefin (e.g., polyethylene, polypropylene, or low density polyethylene). An exemplary fluorosilicone is commercially available from Dow Corning under the trade designation SYL-OFF (e.g., SYL-OFF Q2-7785 or SYL-OFF Q2-7786). Other release liners include, for example, are commercially available under the trade designation CLEARSIL (e.g., CLEARSIL T10 or T50) from CPI Films (St. Louis, Mo.) and under the trade designation LOPAREX (e.g., LOPAREX 5100) from Loparex (Willowbrook, Ill.). Suitable release liners and methods for treating liners are further described in, for example, U.S. Pat. No. 4,472,480 (Olson), U.S. Pat. No. 4,980,443 (Kendziorski), and U.S. Pat. No. 4,736,048 (Brown et al.), U.S. Pat. No. 5,578,381 (Hamada et al.), and U.S. Pat. No. 5,082,706 (Tangney); and U.S. Patent Application Publication 2008/0280086 (Sheridan et al.).

In a third aspect, a cured composition is provided. The cured composition comprises the reaction product of a curable composition. The curable composition comprises a curable system that requires a thermally generated amine to cause curing of the system; and a self-assembled particle distributed in the curable system. The curable system comprises a reactive moiety, and the self-assembled particle comprises a reactive amine ionically bound to a chromonic network. More particularly, the curable composition is according to the first aspect, described in detail above.

In a fourth aspect, a method of making a cured composition is provided. The method comprises (a) obtaining a curable composition; (b) heating the curable composition to release the reactive amine from the self-assembled particle; and (c) forming a cured composition by reacting the reactive amine with the curable system. The curable composition comprises (i) a curable system that requires a thermally generated amine to cause curing of the system, the curable system comprising a reactive moiety; and (ii) a self-assembled particle distributed in the curable system, wherein the self-assembled particle comprises a reactive amine ionically bound to a chromonic network. Typically, the reactive amine reacts with the curable system upon diffusing into the curable system and coming into contact with the reactive moiety. More particularly, the curable composition is according to the first aspect, described in detail above.

In a fifth aspect, a method of adhering two substrates together is provided. The method comprises (a) obtaining a multilayer article; (b) placing a second substrate adjacent to the curable layer; (c) heating the chromonic amine layer to release at least a portion of the reactive amine from being bound to the chromonic network and to react with the reactive moiety; and (d) allowing the curable layer to cure, thereby adhering the first substrate to the second substrate. The multilayer article comprises (i) a first substrate having a first major surface; (ii) a chromonic amine layer disposed on the first major surface of the substrate; and (iii) a curable layer disposed on the chromonic amine layer. The chromonic amine layer comprises a reactive amine ionically bound to a chromonic network. The curable layer comprises a curable system that requires a thermally generated amine to cause curing of the system, and the curable system comprises a reactive moiety. More particularly, the curable composition is according to the first aspect, described in detail above.

In most embodiments, the chromonic amine layer is heated to a temperature of at least 130 degrees Celsius (° C.), at least 135° C., at least 140° C., at least 145° C., at least 150° C., at least 155° C., or at least 160° C.; and up to 180° C., up to 175° C., up to 170° C., or up to 165° C.

Optionally, pressure can be applied to at least one of the first substrate and the second substrate to assist in adhering the first substrate to the second substrate while the curable layer is curing. In certain embodiments, the method includes applying pressure to outer major surfaces of both substrates to enhance their adhesion to each other, such as by using binder clips.

Figure 2:
FIG. 2 is a schematic cross-sectional view of another exemplary multilayer article.

Referring to FIG. 2, a schematic cross-sectional view of a multilayer article comprising two substrates 20 is shown. The article 20 comprises a multilayer article 10 and an additional substrate 18. For instance, the multilayer article 10 comprises a first substrate 12, wherein the first substrate comprises a first major surface 13; a chromonic amine layer 14 disposed on the first major surface of the substrate; and a curable layer 16 disposed on the chromonic amine layer 14 (e.g., on a first major surface of the chromonic amine layer 15). The additional (e.g., second) substrate 18 is attached (e.g., adhered) to the curable layer 18 upon curing of the curable layer 18.

The first and second substrates are typically independently selected from substrates such as metals, ceramics, glasses, composite materials, polymeric materials, and the like, as described in detail above with respect to the second aspect.

Various embodiments are provided that include curable compositions, cured compositions, multilayer articles, and methods of making a cured composition and adhering two substrates together.

Embodiment 1 is a curable composition comprising a curable system that requires a thermally generated amine to cause curing of the system; and a self-assembled particle distributed in the curable system. The curable system comprises at least one reactive moiety and the self-assembled particle comprises a reactive amine ionically bound to a chromonic network.

Embodiment 2 is the curable composition of embodiment 1, wherein the at least one reactive moiety comprises an epoxy resin.

Embodiment 3 is the curable composition of embodiment 1, wherein the curable system comprises an epoxy functionalized (meth)acrylate resin.

Embodiment 4 is the curable composition of any of embodiments 1 to 3, wherein the chromonic network comprises a chromonic material selected from one or more of the following general formulae (I) and (II):

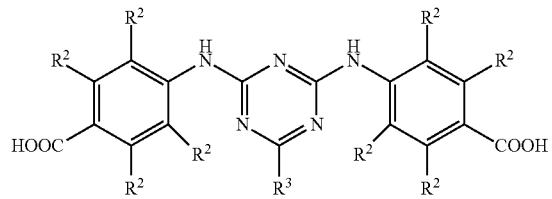

(I)

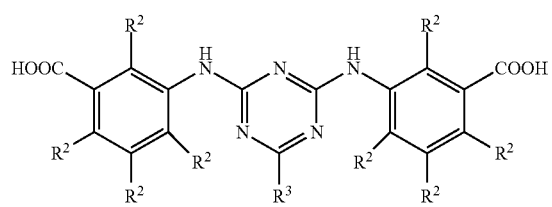

(II)

wherein each $R^2$ is independently selected from the group consisting of electron donating groups, electron withdrawing groups, and electron neutral groups, and $R^3$ is selected from the group consisting of substituted and unsubstituted heteroaromatic rings and substituted and unsubstituted heterocyclic rings, said rings being linked to the triazine group through a nitrogen atom within the ring of $R^3$, and zwitterions, proton tautomers, and salts thereof.

Embodiment 5 is the curable composition of embodiment 4, wherein each $R^2$ is hydrogen.

Embodiment 6 is the curable composition of embodiment 4 or embodiment 5, wherein $R^3$ is a substituted heteroaromatic ring.

Embodiment 7 is the curable composition of any of embodiments 4 to 6, wherein $R^3$ is selected from the group consisting of a monovalent group selected from: substituted pyridinium, substituted imidazolium, quinolinium, and substituted pyrimidinium.

Embodiment 8 is the curable composition of any of embodiments 1 to 7, wherein the chromonic network comprises a chromonic material of the following formula (III):

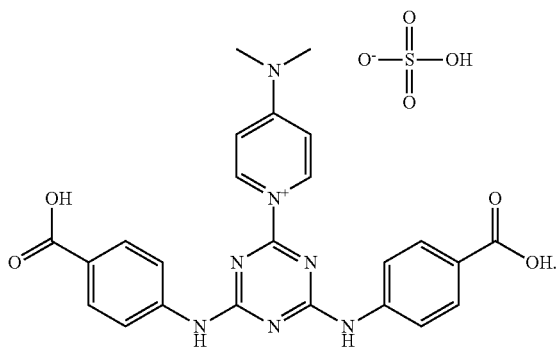

(III)

Embodiment 9 is the curable composition of any of embodiments 1 to 8, wherein the chromonic network comprises a chromonic material of the following formula (IV):

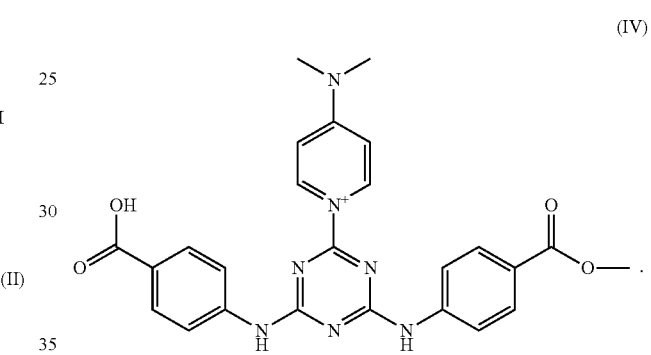

(IV)

Embodiment 10 is the curable composition of any of embodiments 1 to 9, wherein the reactive amine is of the general formula (V):

—$NR^4H$ (V)

wherein $R^4$ is selected from hydrogen, alkyl, aryl, or alkylaryl.

Embodiment 11 is the curable composition of any of embodiments 1 to 9, wherein the reactive amine is of the general formula (VI):

(VI)

wherein each $R^5$ is independently selected from hydrogen, alkyl, aryl, or alkylaryl;

$R^6$ is an alkylene or a heteroalkylene; and q is an integer from 1 to 10, inclusive.

Embodiment 12 is the curable composition of any of embodiments 1 to 9, wherein the reactive amine is a polyether diamine.

Embodiment 13 is the curable composition of any of embodiments 1 to 12, wherein the self-assembled particle comprises 1 to 80 weight percent reactive amine and 20 to 99 weight percent chromonic network, or 1 to 50 weight percent reactive amine and 20 to 50 weight percent chromonic network.

Embodiment 14 is the curable composition of any of embodiments 1 to 13, wherein the self-assembled particle further comprises a coating layer disposed on at least a portion of an outer surface of the self-assembled particle.

Embodiment 15 is the curable composition of embodiment 13, wherein the coating layer comprises a wax, a thermoplastic polymer material, a fluoropolymer, a plurality of silica particles, or a combination thereof.

Embodiment 16 is the curable composition of embodiment 14 or embodiment 15, wherein the self-assembled particle comprises 1 to 79 weight percent coating layer.

Embodiment 17 is the curable composition of any of embodiments 14 to 16, wherein the coating layer has a thickness of 0.1 micrometers to 5 micrometers.

Embodiment 18 is the curable composition of any of embodiments 2 to 17, wherein the epoxy resin comprises an epoxide equivalent number of 2.0 or greater.

Embodiment 19 is the curable composition of any of embodiments 2 to 18, wherein the epoxy resin comprises a bisphenol A diglycidyl ether, a bisphenol F diglycidyl ether, an aliphatic epoxide, a cycloaliphatic epoxide, an epoxy novolac, a heterocyclic epoxy, or a combination thereof.

Embodiment 20 is the curable composition of any of embodiments 2 to 18, wherein the epoxy resin comprises a diglycidyl ether.

Embodiment 21 is the curable composition of any of embodiments 1 to 20, comprising 5 to 45 weight percent self-assembled particles and 55 to 95 weight percent curable system.

Embodiment 22 is the curable composition of any of embodiments 1 to 21, wherein the curable system further comprises at least one additive selected from fillers, fire retardants, antistatic materials, thermally and/or electrically conductive particles, expanding agents, and combinations thereof.

Embodiment 23 is a multilayer article. The multilayer article comprises a substrate having a first major surface; a chromonic amine layer disposed on the first major surface of the substrate; and a curable layer disposed on the chromonic amine layer. The chromonic amine layer comprises a reactive amine ionically bound to a chromonic network. The curable layer comprises a curable system that requires a thermally generated amine to cause curing of the system, the curable system comprising a reactive moiety.

Embodiment 24 is the multilayer article of embodiment 23, further comprising a liner disposed on the curable layer.

Embodiment 25 is the multilayer article of embodiment 23 or embodiment 24, wherein the substrate is selected from a metal, a polymeric material, a ceramic, a glass, and a composite material.

Embodiment 26 is the multilayer article of any of embodiments 23 to 25, wherein the chromonic amine layer comprises a first major surface and the curable layer is directly attached to the first major surface of the chromonic amine layer.

Embodiment 27 is the multilayer article of any of embodiments 23 to 26, wherein the chromonic amine layer has a dry thickness of from 0.1 micrometers to 10 micrometers.

Embodiment 28 is the multilayer article of any of embodiments 23 to 27, wherein the curable layer has a dry thickness of from 1 micrometer to 100 micrometers.

Embodiment 29 is the multilayer article of any of embodiments 23 to 28, wherein the at least one reactive moiety comprises an epoxy resin.

Embodiment 30 is the multilayer article of any of embodiments 23 to 28, wherein the curable system comprises an epoxy functionalized (meth)acrylate resin.

Embodiment 31 is the multilayer article of any of embodiments 23 to 30, wherein the chromonic network comprises a chromonic material selected from one or more of the following general formulae (I) and (II):

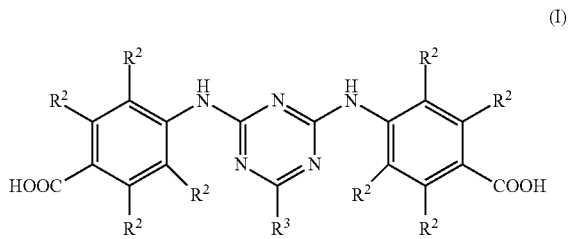

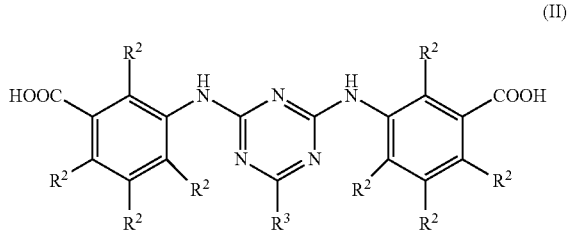

wherein
each $R^2$ is independently selected from the group consisting of electron donating groups, electron withdrawing groups, and electron neutral groups, and
$R^3$ is selected from the group consisting of substituted and unsubstituted heteroaromatic rings and substituted and unsubstituted heterocyclic rings, said rings being linked to the triazine group through a nitrogen atom within the ring of $R^3$,
and zwitterions, proton tautomers, and salts thereof.

Embodiment 32 is the multilayer article of embodiment 31, wherein each $R^2$ is hydrogen.

Embodiment 33 is the multilayer article of embodiment 31 or embodiment 32, wherein $R^3$ is a substituted heteroaromatic ring.

Embodiment 34 is the multilayer article of any of embodiments 31 to 33, wherein $R^3$ is selected from the group consisting of a monovalent group selected from: substituted pyridinium, substituted imidazolium, quinolinium, and substituted pyrimidinium.

Embodiment 35 is the multilayer article of any of embodiments 23 to 34, wherein the chromonic network comprises a chromonic material of the following formula (III):

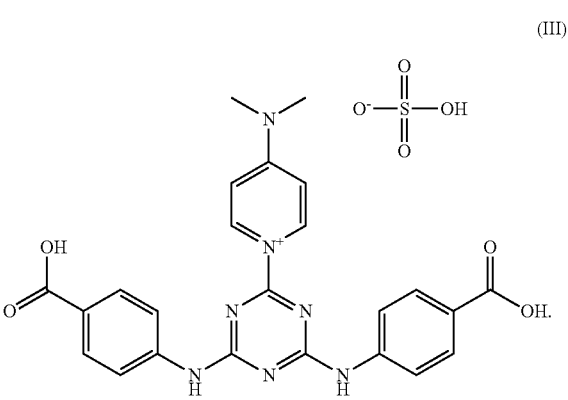 [SMILES: CN(C)c1cc[n+](-c2nc(Nc3ccc(C(=O)O)cc3)nc(Nc3ccc(C(=O)O)cc3)n2)cc1 ; O=S(=O)([O-])O]

Embodiment 36 is the multilayer article of any of embodiments 23 to 34, wherein the chromonic network comprises a chromonic material of the following formula (IV):

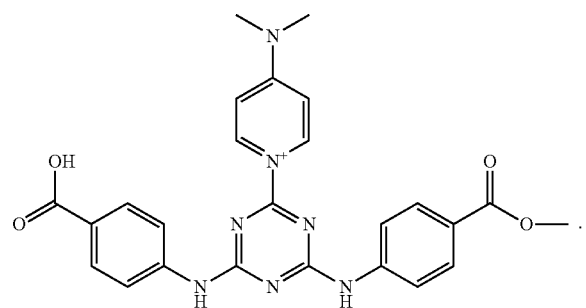

Embodiment 37 is the multilayer article of any of embodiments 23 to 36, wherein the reactive amine is of the general formula (V):

wherein $R^4$ is selected from hydrogen, alkyl, aryl, or alkylaryl.

Embodiment 38 is the multilayer article of any of embodiments 23 to 37, wherein the reactive amine is of the general formula (VI):

wherein each $R^5$ is independently selected from hydrogen, alkyl, aryl, or alkylaryl;
$R^6$ is an alkylene or a heteroalkylene; and
q is an integer from 1 to 10, inclusive.

Embodiment 39 is the multilayer article of any of embodiments 23 to 38, wherein the reactive amine is a polyether diamine.

Embodiment 40 is the multilayer article of any of embodiments 24 to 39, wherein the epoxy resin comprises an epoxide equivalent number of 2.0 or greater.

Embodiment 41 is the multilayer article of any of embodiments 24 to 40, wherein the epoxy resin comprises a bisphenol A diglycidyl ether, a bisphenol F diglycidyl ether, an aliphatic epoxide, a cycloaliphatic epoxide, an epoxy novolac, a heterocyclic epoxy, or a combination thereof.

Embodiment 42 is the multilayer article of any of embodiments 24 to 41, wherein the epoxy resin comprises a diglycidyl ether.

Embodiment 43 is the multilayer article of any of embodiments 23 to 42, wherein the curable system further comprises at least one additive selected from fillers, fire retardants, antistatic materials, thermally and/or electrically conductive particles, expanding agents, and combinations thereof.

Embodiment 44 is a cured composition comprising the reaction product of a curable composition. The curable composition comprises a curable system that requires a thermally generated amine to cause curing of the system; and a self-assembled particle distributed in the curable system. The curable system comprises a reactive moiety, and the self-assembled particle comprises a reactive amine ionically bound to a chromonic network.

Embodiment 45 is a method of making a cured composition. The method comprises (a) obtaining a curable composition; (b) heating the curable composition to release the reactive amine from the self-assembled particle; and (c) forming a cured composition by reacting the reactive amine with the curable system. The curable composition comprises (i) a curable system that requires a thermally generated amine to cause curing of the system, the curable system comprising a reactive moiety; and (ii) a self-assembled particle distributed in the curable system, wherein the self-assembled particle comprises a reactive amine ionically bound to a chromonic network.

Embodiment 46 is a method of adhering two substrates together. The method comprises (a) obtaining a multilayer article; (b) placing a second substrate adjacent to the curable layer; (c) heating the chromonic amine layer to release at least a portion of the reactive amine from being bound to the chromonic network and to react with the reactive moiety; and (d) allowing the curable layer to cure, thereby adhering the first substrate to the second substrate. The multilayer article comprises (i) a first substrate having a first major surface; (ii) a chromonic amine layer disposed on the first major surface of the substrate; and (iii) a curable layer disposed on the chromonic amine layer. The chromonic amine layer comprises a reactive amine ionically bound to a chromonic network. The curable layer comprises a curable system that requires a thermally generated amine to cause curing of the system, the curable system comprising a reactive moiety.

Embodiment 47 is the method of embodiment 46, wherein the chromonic amine layer is heated to a temperature of at least 140 degrees Celsius.

Embodiment 48 is the method of embodiment 46 or embodiment 47, wherein the chromonic layer is heated to a temperature of at least 150 degrees Celsius.

Embodiment 49 is the method of any of embodiments 46 to 48, further comprising disposing a liner on the curable layer.

Embodiment 50 is the method of any of embodiments 46 to 49, further comprising applying pressure to at least one of the first substrate and the second substrate to assist in adhering the first substrate to the second substrate while the curable layer is curing.

Embodiment 51 is the method of any of embodiments 46 to 50, wherein the first substrate and the second substrate are independently selected from a metal, a polymeric material, a ceramic, a glass, and a composite material.

Examples

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims. Unless otherwise noted, all chemicals used in the examples can be obtained from the indicated suppliers.

TABLE 1

List of materials and suppliers

| Material | Description and Source |
| --- | --- |
| CMX | 4-Dimethylamino-1-[4,6-di(4-carboxyphenylamino)-1,3,5-triazin-2-yl]pyridinium chromonic molecules. Made according to Example 1 of U.S. Pat. No. 6,395,354. |
| T403 | Trade designation for JEFFAMINE T-403 polyetheramine, a trifunctional primary amine with a weight average molecular weight of 400 grams/mole obtained from Huntsman Corporation (The Woodlands, Texas, USA). |
| CSA9005X | Solution adhesive comprising copolymer of methyl acrylate/butyl acrylate/glycidyl methacrylate (80/15/5) in ethyl acetate with 40% solid. Made according to Preparatory Example A. |
| EPON 828 | Epoxy resin comprising the diglycidyl ether of bisphenol A obtained from Momentive Specialty Chemicals, Inc. (Columbus, OH, USA). |
| MEK | Methyl ethyl ketone obtained from Sigma Aldrich (St. Louis, MO, USA). |
| IPA | Isopropyl alcohol obtained from Sigma Aldrich (St. Louis, MO, USA). |
| BA | Butyl acrylate obtained from BASF, Germany. |
| MA | Methyl acrylate obtained from BASF, Germany. |
| GMA | Glycidyl methacrylate obtained from The Dow Chemical Corporation (Midland, MI, USA). |
| EA | Ethyl acetate solvent obtained from Shanghai Wujing Chemical Factory (Shanghai, China). |
| VAZO-67 | 2,2'-azo-di-(2-methylbutyronitrile), free radical thermal initiator (AMBN) obtained from Dupont (USA). |
| Ethylene diamine | Ethylene diamine obtained from Sigma Aldrich (St. Louis, MO, USA) |
| Ethylene tetramine | Ethylene tetramine obtained from Sigma Aldrich (St. Louis, MO, USA) |
| Piperazine | Piperazine obtained from Sigma Aldrich (St. Louis, MO, USA) |
| ANCAMINE K54 | 2,4,6-Tri(dimethylaminomethyl) phenol obtained from Air Products and Chemicals, Inc. (Allentown, PA, USA). |
| GMP800 | Mercaptan-terminated polymeric curing agent obtained from Gabriel Performance Products (Ashtabula, OH, USA). |
| AMICURE CG1200 | Dicyandiamide curing agent obtained from Air Products (Allentown, PA, USA). |
| CAB-O-SIL TS720 | Fumed silica obtained from Cabot Corporation (Boston, MA, USA). |
| OMICURE U52 | Aromatic substituted urea obtained from Emerald Performance Materials (Moorestown, NJ, USA). |

Test Methods

Differential Scanning Calorimetry (DSC)

Small samples of epoxy mixtures were prepared to determine the thermal properties of the particles through differential scanning calorimetry (DSC) experiments. Compositions were prepared by weighing out EPON 828 Resin into small Dac plastic containers, then adding accelerators and other fillers to the containers. Samples were Dac mixed (SPEEDMIXER DAC 150.1 FV, Flacktek, Inc.) at 3000 RPM for 1 minute. Then, samples were weighed into DSC pans for analysis.

DSC was performed on a MODEL Q2000 DSC instrument (TA Instruments Inc., New Castle, Del., USA). DSC samples were typically 6 to 20 milligrams. Testing was done in sealed, aluminum, T-zero sample pans, by heating at a rate of 5 degrees Celsius (° C./min) from room temperature (25° C.) to 300° C. The data from the reaction process was graphed on a chart showing heat flow versus temperature. The integrated area under an exothermic peak represented the total exotherm energy produced during the reaction and was measured in Joules/gram (J/g); the exotherm energy was proportional to extent of cure (that is, degree of polymerization). The exotherm profile (that is, the onset temperature (the temperature at which reaction will begin to occur), the peak temperature, and the end temperature) provided information on conditions needed to cure the sample.

Overlap Shear Strength ("OLS")

Test panels measuring 2.5 cm wide by 10.2 cm long (1 inch by 4 inches) of steel were used to evaluate overlap shear adhesion. The steel coupons used for measuring shear strength were cold-rolled steel (obtained from Q-Lab Corp., Westlake, Ohio, USA under the trade designation "Q-PANEL, RS-14"). The bonding surfaces of the panels were cleaned by lightly abrading them using a 3M SCOTCH-BRITE No. 86 scouring pad (green colored), followed by an isopropyl alcohol wipe to remove any loose debris. A bead of adhesive was then dispensed crosswise along one end of a test panel, about 6.4 mm (0.25 inch) from the end. The panels were joined together face to face along their length to provide an overlap bond area measuring approximately 1.3 cm long and 2.5 cm wide (0.5 inch by 1 inch). A uniform bond line thickness was provided by sprinkling a small amount of 10 mil (about 254 micrometers or 0.010 inches) diameter solid glass beads on the adhesive before joining the two test panels together. The bonded test panel samples were clamped with binder clips and allowed to cure under 180° C. for 10 minutes. The samples were tested at 22° C. for peak overlap shear strength at a separation rate of 12.5 millimeters (mm) per minute. The reported values represent the average of three samples. Results were reported in pound per square inch (Psi).

T-Peel Adhesion Test

The adhesive mixture was coated on a PET release liner to form an adhesive film with a thickness of 0.06 mm, then the film was cut into 1 inch (2.54 cm) width sample strips. The exposed adhesive face of one sample strip was covered onto stainless steel. The sample strip was hot pressure laminated at a temperature of 120° C. and at a pressure of 0.2 MPa for 10 seconds, then the PET liner on the top of the sample strip was removed. A polyimide (PI) film (75 micrometer thickness) was hot pressure laminated onto the exposed adhesive face of the sample strip for 10 minutes at a temperature of 180° C. and at a pressure of 0.5-1.0 MPa. The prepared SS-Adhesive-PI sandwich piece was placed into a 180° C. oven for varied curing times, then cooled down at room temperature (25° C.).

A T-peel test was performed at 25° C. on the SS-Adhesive-PI sandwich piece prepared as described above using a Tensile Tester available from Instron Corp. The cross-head speed was 2 inches/min (50 mm/min). The test was repeated three times for each sample and the average value recorded in Newtons per millimeter (N/mm).

Preparatory Example A. Synthesis of Reactive Poly(Meth)Acrylate Having Reactive Functional Groups All the raw materials were weighed into a 500 ml 3-neck flask according to the following amounts: MA 80 g/BA 15 g/GMA 5 g/EA 149.8 g/VAZO-67 0.2 g. The materials were stirred using a pneumatic stirrer (ZD-J-1 type, Shanghai Zuoda Spray Coating Equipments Co., Ltd) while being purged with N2. The temperature was raised to 60° C. to allow for reaction for 24 hours. After cooling, a pale yellow clear, viscous liquid (solids content 40%) was obtained, which was directly used in subsequent experiments without any treatment. The poly(meth)acrylate had a $T_g$ of −2° C.

Preparatory Example B. Preparation of CMX/T403 Particles

Figure 3:
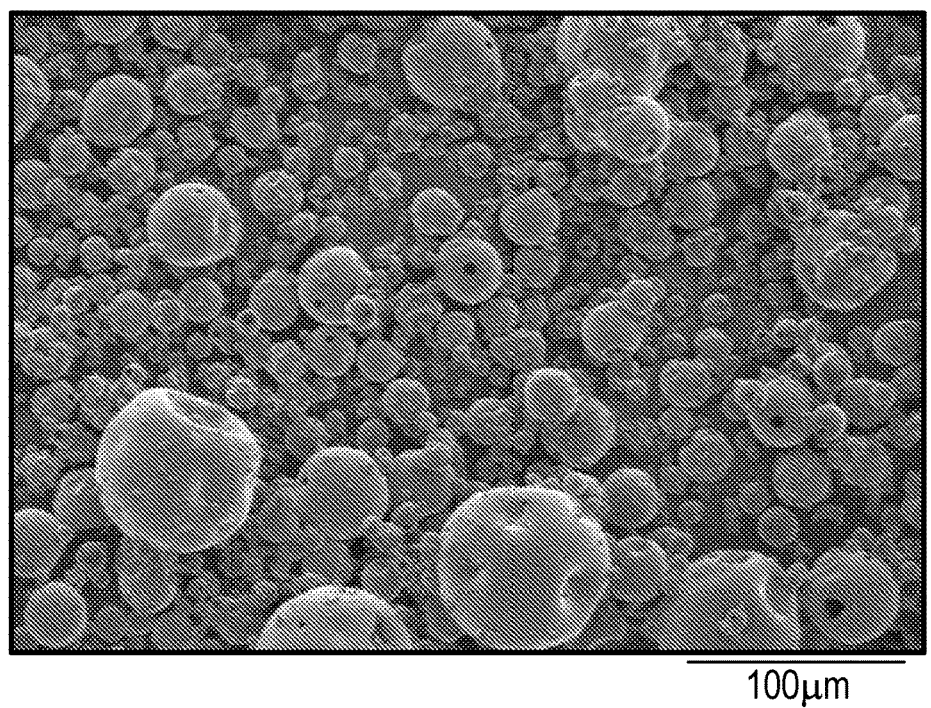
FIG. 3 is a scanning electron microscopy (SEM) image of the particles of Preparatory Example B.

The CMX (30 grams) and T403 (30 grams) were mixed with 120 g of water to give 33% solids in solution. The mixture was stirred vigorously for 2 hours at room temperature until the CMX was completely dissolved. The resulting mixture solution was then used as the precursor for spray drying to form the complex particles. The particles were spray dried using a MINI-PROBE B-190 cyclone spray dryer (available from Buchi) at a flow rate of 10 RPM and an inlet temperature set at 160° C. (outlet reading of 65-70° C.). Scanning electron microscopy (SEM) images of the particles were as shown in FIG. 3.

Preparatory Example C. Preparation of CMX/ANCAMINE K54 Particles

The CMX (2 grams) and ANCAMINE K54 (1 gram) were mixed with 9 g of water to give 25% solids in solution. The mixture was stirred vigorously for 2 hours at room temperature until the CMX was completely dissolved. Next, an excess of ethanol was dripped into the solution to precipitate the CMX/ANCAMINE K54 particles.

Examples 1-5 (EX-1 to EX-5)

The prepared CMX/T403 particles were combined with EPON 828 by high speed mixer (SPEEDMIXER DAC 150.1 FV, Flacktek, Inc. (Landrum, S.C., USA) at 3000 rpm for approximately 10 minutes until a homogeneous mixture was obtained. The epoxy film formulations prepared are listed in Table 2 below.

TABLE 2

Epoxy film formulations

| Materials, grams | EX-1 (grams) | EX-2 (grams) | EX-3 (grams) | EX-4 (grams) | EX-5 (grams) |
| --- | --- | --- | --- | --- | --- |
| EPON 828 | 10 | 9 | 8 | 7 | 6 |
| CMX/T403 particles | 0 | 1 | 2 | 3 | 4 |

DSC measurements of heat flow versus temperature were made to compare the T403 reactive amine (T403 alone), and the CMX/T403 particles, and the results were plotted. The plot for the T403 alone showed its curing temperature at 131° C. The plot for the CMX/T403 particles showed its curing temperature at 162° C.

The epoxy film adhesives were tested, with overlap shear strength results as summarized in Table 3 below (in both pounds per square inch and megapascals).

TABLE 3

OLS results of EX-1 through EX-5.

| Materials, grams | EX-1 | EX-2 | EX-3 | EX-4 | EX-5 |
| --- | --- | --- | --- | --- | --- |
| OLS (psi) | 0 | 608 ± 120 | 2200 ± 264 | 2418 ± 196 | 1548 ± 82 |
| (MPa) | | (4.2 ± 0.8) | (15.2 ± 1.8) | (16.7 ± 1.4) | (10.7 ± 0.6) |
| CMX/T403 particles (%) | 0 | 10 | 20 | 30 | 40 |

Examples 6-11 (EX-6 to EX-11)

The prepared CMX/T403 particles were combined with CSA9005X using a high speed mixer (SPEEDMIXER DAC 150.1 FV, Flacktek, Inc. (Landrum, S.C., USA) at 3000 rpm for approximately 10 minutes until a homogeneous mixture was obtained. The solid content of resulting liquid mixture was adjusted to 40% by ethyl acetate. The acrylate film formulations were prepared as listed in Table 4 below.

TABLE 4

Acrylate film formulations

| Materials, grams | EX-6 | EX-7 | EX-8 | EX-9 | EX-10 | EX-11 |
| --- | --- | --- | --- | --- | --- | --- |
| CSA9005X (amounts as solid) | 10.0 | 9.98 | 9.95 | 9.90 | 9.50 | 9.00 |
| CMX/T403 particles | 0.0 | 0.02 | 0.05 | 0.10 | 0.50 | 1.00 |

The T-peel strength results demonstrated an early rise in cure in the first 20 minutes as compared to the control (0%), with 90 degree peel strength results after curing via hot lamination of the film formulations at 180° C. for various times, as summarized in Table 5 below.

TABLE 5

| 90 Degree peel strength in N/mm | | | | | | |
|---|---|---|---|---|---|---|
| | EX-6 | EX-7 | EX-8 | EX-9 | EX-10 | EX-11 |
| CMX/T403 particles (%) | 0 | 0.2 | 0.5 | 1 | 5 | 10 |
| 2 minutes | 2.118 | 2.032 | 2.132 | 2.239 | 2.310 | 1.714 |
| 5 minutes | 2.194 | 2.183 | 2.478 | 2.647 | 2.069 | 1.871 |
| 10 minutes | 2.286 | 2.213 | 2.600 | 2.787 | 2.145 | 1.653 |
| 20 minutes | 2.424 | 2.277 | 2.598 | 2.900 | 2.766 | 1.746 |
| 30 minutes | 3.022 | 2.452 | 2.626 | 2.787 | 2.498 | 1.914 |
| 40 minutes | 3.134 | 2.546 | 2.615 | 2.830 | 2.239 | 1.931 |
| 50 minutes | 3.355 | 2.555 | 2.800 | 2.895 | 2.095 | 1.915 |
| 60 minutes | 3.580 | 2.541 | 2.671 | 3.009 | 1.948 | 1.877 |

Example 12 (EX-12)

Figure 4:
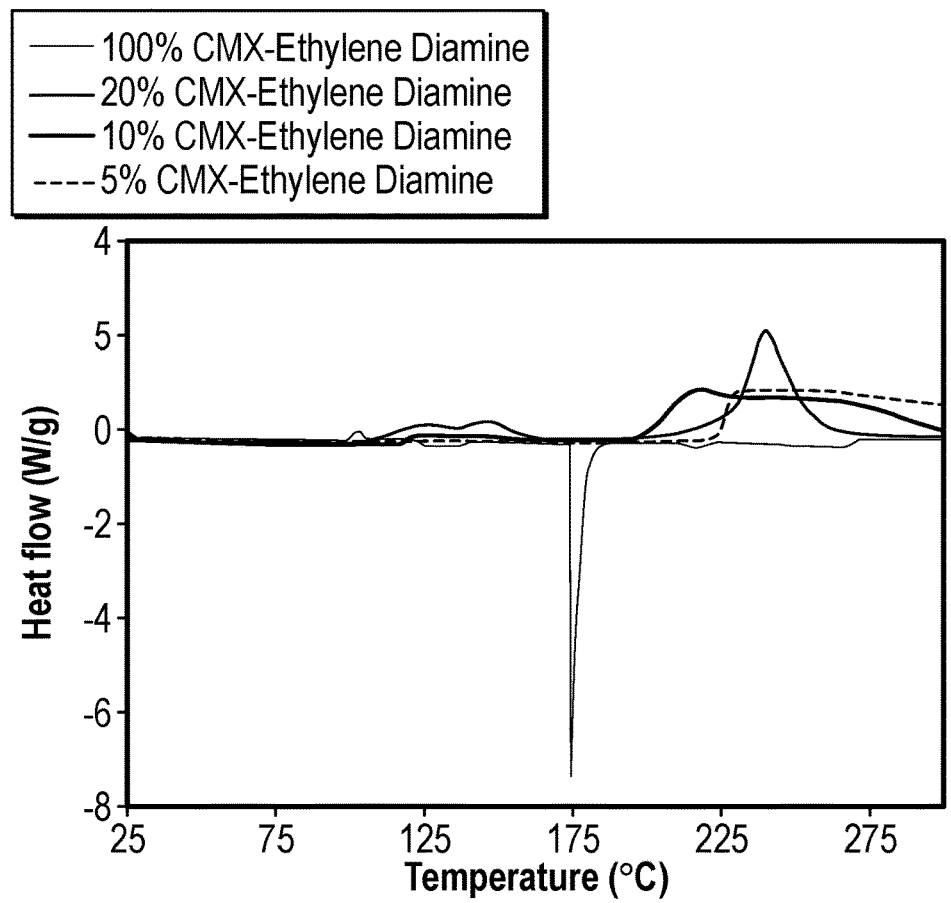
FIG. 4 is a differential scanning calorimetry (DSC) graph of exemplary compositions of Example 12.

30 g CMX and 3.4 g ethylene diamine were added to 120 g water and stirred until the solids dissolved completely. The resulting solution was then spray dried as described in Preparatory Example B. FIG. 4 shows a Differential scanning calorimetry curing profile of Epon 828 in the presence of different amounts of the spray dried material.

Example 13 (EX-13)

Figure 5:
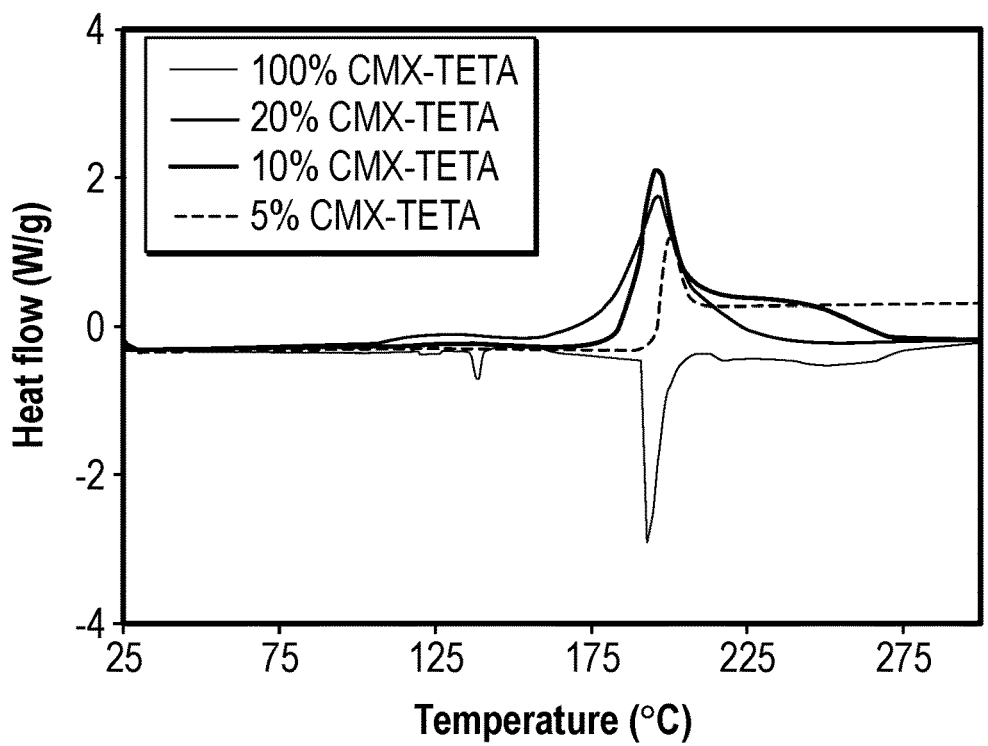
FIG. 5 is a DSC graph of an exemplary composition of Example 13.

30 g CMX and 8.3 g ethylene tetramine were added to 120 g water and stirred until the solids dissolved completely. The resulting solution was then spray dried as described in Preparatory Example B. FIG. 5 shows a Differential scanning calorimetry curing profile of Epon 828 in the presence of different amounts of the spray dried material.

Example 14 (EX-14)

30 g CMX and 4.8 g piperazine were added to 120 g water and stirred until the solids dissolved completely. The resulting solution was then spray dried as described in Preparatory Example B.

Example 15 (EX-15)

The CMX (30 grams) and T403 (30 grams) were mixed with 120 g of water. The mixture was stirred vigorously for 2 hours at room temperature until the CMX was completely dissolved. Using a number 4 wire-wound coating rod purchased form Precision Coating Rods (Tampa, Fla., USA) a 4 mils (0.102 mm) wet coating was deposited on a 2 inch steel plated previously cleaned with isopropyl alcohol. The coating was then air dried at room temperature for 5 minutes then oven dried at 50 degrees C. for 30 minutes. A thin coating of an epoxy containing adhesive formulation was then deposited directly on the CMX-Amine dried coating. Another clean steel plate was then clamped on top of the adhesive and the "sandwich" was cured at 150 degrees C. for 30 minutes. Overlap shear results were comparable to the formulation using the spray dried form of the material.

Example 16 (EX-16)

Figure 6:
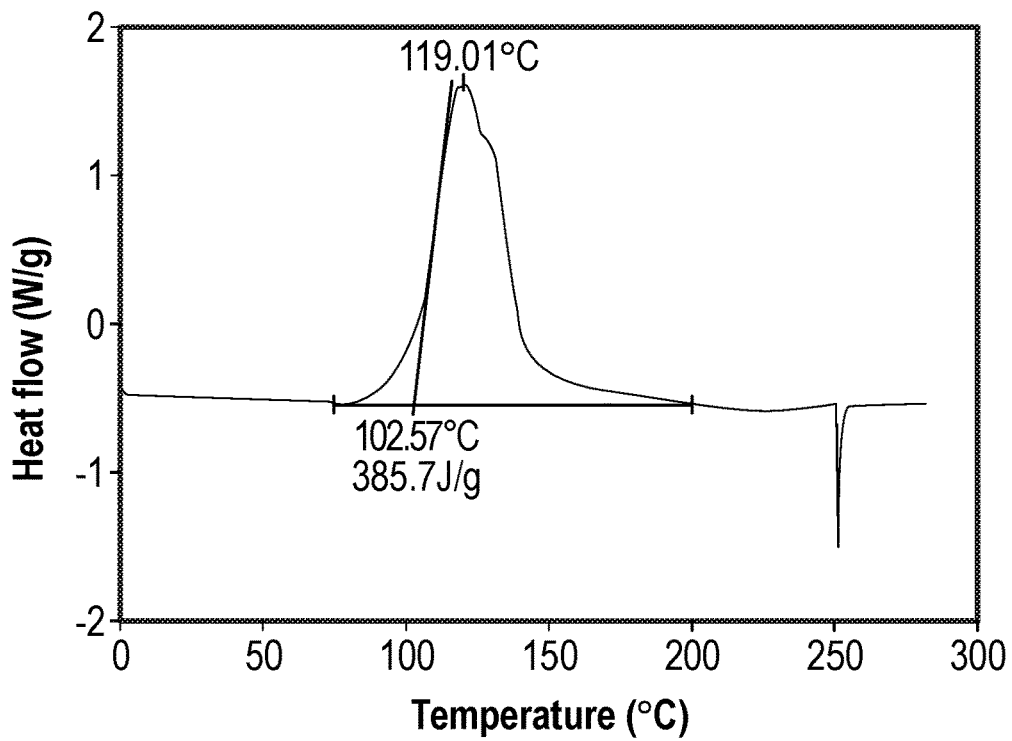
FIG. 6 is a DSC graph of an exemplary composition of Example 16.

0.33 g of the prepared CMX/ANCAMINE K54 particles was blended with 1.9 g of EPON 828 and 2.8 g of GMP800 using a high speed mixer (SPEEDMIXER DAC 150.1 FV, Flacktek, Inc. (Landrum, S.C., USA) at 3000 rpm for 1 minute. The blended formulation was stable at room temperature for over two weeks. DSC measurements of heat flow versus temperature were made, and the results were plotted. FIG. 6 shows the curing temperature for the sample containing CMX/ANCAMINE K54 particles at 119.8° C. EX-16 exhibited a total exotherm energy of 385.7 J/g.

Comparative Example 1 (CE-1)

0.1 g of K54 was blended with 1.9 g of EPON 828 and 2.8 g of GMP800 using a high speed mixer (SPEEDMIXER DAC 150.1 FV, Flacktek, Inc. (Landrum, S.C., USA) at 3000 rpm for 1 minute. The sample began to cure immediately upon mixing, thus the total exotherm energy of 73.3 J/g represents only a portion of the entire reaction energy. The sample of CE-1 cured to hardness within 30 minutes. DSC measurements of heat flow versus temperature were made, and the results were plotted. The sample exhibited a curing temperature at 47.2° C.

Example 17 (EX-17)

Figure 7:
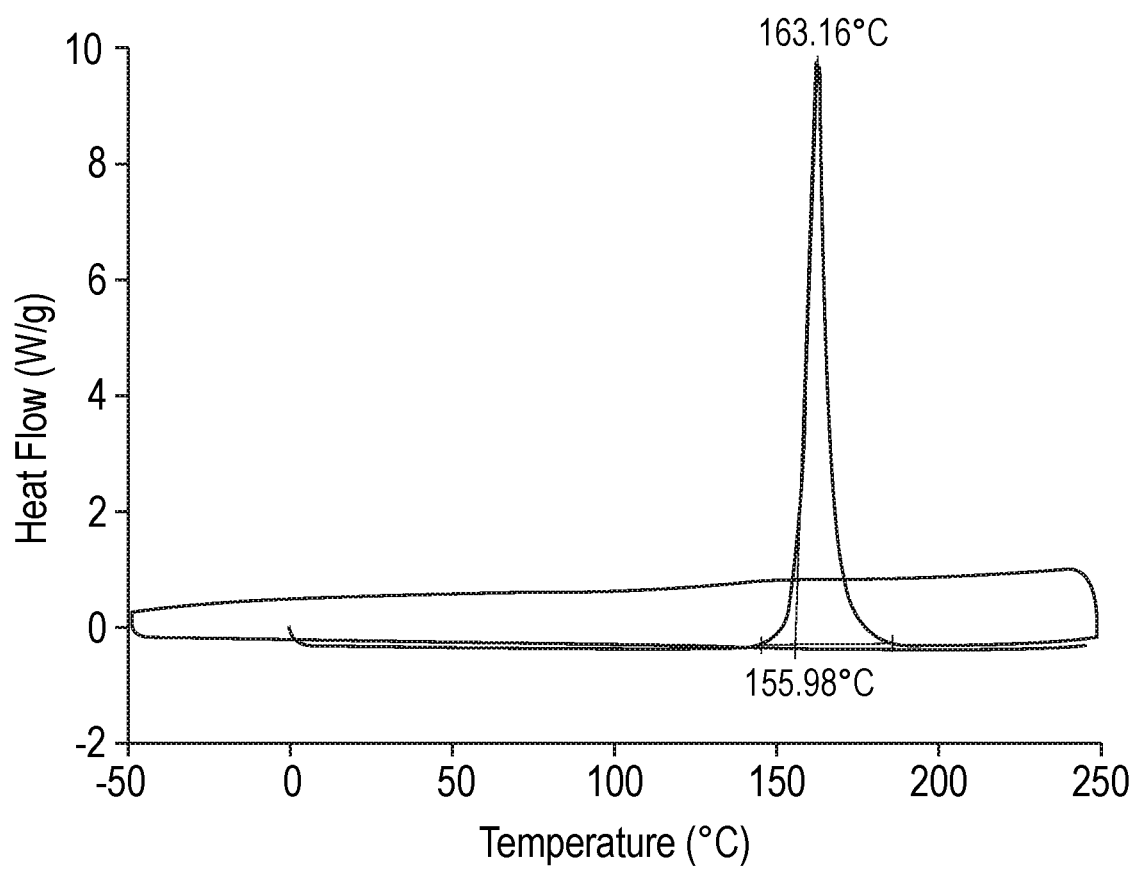
FIG. 7 is a DSC graph of an exemplary composition of Example 17.

1.64 g of the prepared CMX/ANCAMINE K54 particles was blended with 16.44 g of EPON 828, 1.32 g of AMICURE CG1200, and 0.60 g of CAB-O-SIL TS-720 using a high speed mixer (SPEEDMIXER DAC 150.1 FV, Flacktek, Inc. (Landrum, S.C., USA) at 3000 rpm for 1 minute. The blended formulation was stable at room temperature for over two weeks. DSC measurements of heat flow versus temperature were made, and the results were plotted. FIG. 7 shows the curing temperature for the sample containing CMX/ANCAMINE K54 particles at 163.16° C. EX-17 exhibited a total exotherm energy of 469 J/g.

Comparative Example 2 (CE-2)

17.91 g of EPON 828 was blended with 1.43 g of AMICURE CG1200 and 0.65 g of CAB-O-SIL TS-720 using a high speed mixer (SPEEDMIXER DAC 150.1 FV, Flacktek, Inc. (Landrum, S.C., USA) at 3000 rpm for 1 minute. DSC measurements of heat flow versus temperature were made, and the results were plotted. The sample exhibited a curing temperature at 199° C. CE-2 exhibited a total exotherm energy of 467 J/g.

Comparative Example 3 (CE-3)

16.944 g of EPON 828 was blended with 1.32 g of AMICURE CG1200, 0.60 g of CAB -0-SIL TS-720, and 0.60 g of OMICURE U52 using a high speed mixer (SPEEDMIXER DAC 150.1 FV, Flacktek, Inc. (Landrum, S.C., USA) at 3000 rpm for 1 minute. DSC measurements of heat flow versus temperature were made, and the results were plotted. The sample exhibited a curing temperature at 155° C. CE-3 exhibited a total exotherm energy of 471 J/g.

Various modifications to this disclosure will become apparent to those skilled in the art without departing from the scope and spirit of this disclosure. It should be understood that the illustrative embodiments and examples set forth herein are not intended to unduly limit the scope of the present disclosure, with the scope intended to be limited only by the claims set forth herein as follows.

What is claimed is:

1. A curable composition comprising:
   a curable system that requires a thermally generated amine to cause curing of the system, the curable system comprising at least one reactive moiety; and a self-assembled particle distributed in the curable system, wherein the self-assembled particle comprises a reactive amine ionically bound to a chromonic network.

2. The curable composition of claim 1, wherein the at least one reactive moiety comprises an epoxy resin.

3. The curable composition of claim 1, wherein the chromonic network comprises a chromonic material of the following formula (III):

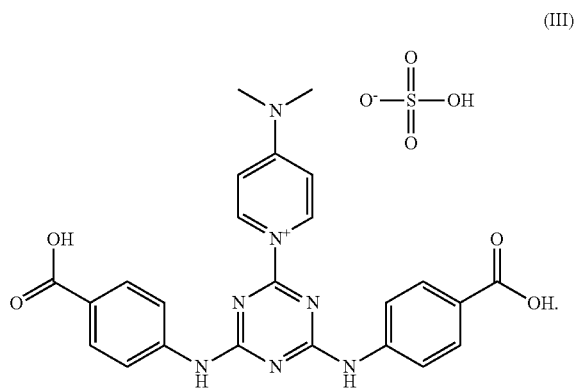 [SMILES: CN(C)c1cc[n+](-c2nc(Nc3ccc(C(=O)O)cc3)nc(Nc3ccc(C(=O)O)cc3)n2)cc1 ; O=S(=O)([O-])O]

(III)

4. The curable composition of claim 1, wherein the chromonic network comprises a chromonic material of the following formula (IV):

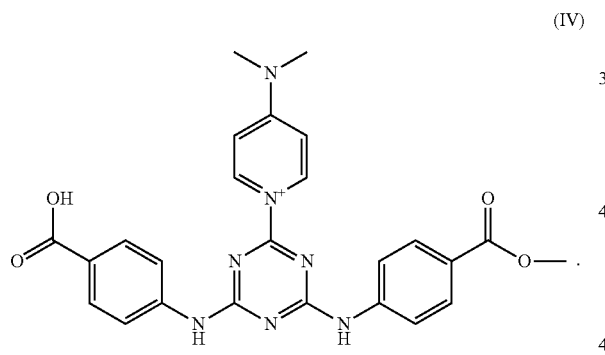

(IV)

5. The curable composition of claim 1, wherein the reactive amine is of the general formula (V):

—NR⁴H     (V)

wherein $R^4$ is selected from hydrogen, alkyl, aryl, or alkylaryl.

6. The curable composition of claim 1, wherein the reactive amine is of the general formula (VI):

(VI)

wherein each $R^5$ is independently selected from hydrogen, alkyl, aryl, or alkylaryl;

$R^6$ is an alkylene or a heteroalkylene; and q is an integer from 1 to 10, inclusive.

7. The curable composition of claim 1, wherein the self-assembled particle further comprises a coating layer disposed on at least a portion of an outer surface of the self-assembled particle.

8. The curable composition of claim 2, wherein the epoxy resin comprises a bisphenol A diglycidyl ether, a bisphenol F diglycidyl either, an aliphatic epoxide, a cycloaliphatic epoxide, an epoxy novolac, a heterocyclic epoxy, or a combination thereof.

9. A method of making a cured composition, the method comprising:

a. obtaining a curable composition comprising:

i. a curable system that requires a thermally generated amine to cause curing of the system, the curable system comprising a reactive moiety; and ii. a self-assembled particle distributed in the curable system, wherein the self-assembled particle comprises a reactive amine ionically bound to a chromonic network;

b. heating the curable composition to release the reactive amine from the self-assembled particle; and c. forming a cured composition by reacting the reactive amine with the curable system.

\* \* \* \* \*

UNITED STATES PATENT AND TRADEMARK OFFICE
CERTIFICATE OF CORRECTION

PATENT NO. : 11,084,959 B2
APPLICATION NO. : 16/305907
DATED : August 10, 2021
INVENTOR(S) : Hassan Sahouani Page 1 of 1

It is certified that error appears in the above-identified patent and that said Letters Patent is hereby corrected as shown below:

In the Claims

Column 35

Line 30-45, Claim 4, delete " 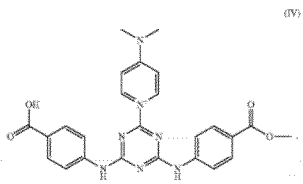 [SMILES: COC(=O)c1ccc(Nc2nc(Nc3ccc(C(=O)O)cc3)nc(-[n+]3ccc(N(C)C)cc3)n2)cc1] " and insert

-- 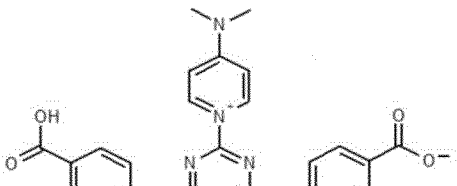 (IV) --, therefor.

Column 36
Line 28, Claim 8, delete "either" and insert -- ether --, therefor.
Line 44, Claim 9, delete "a" and insert -- the --, therefor.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*